(12) United States Patent
Ben-Dayan et al.

(10) Patent No.: US 12,430,453 B2
(45) Date of Patent: Sep. 30, 2025

(54) MITIGATING DISTORTIONS IN PRINTED IMAGES

(71) Applicant: LANDA CORPORATION LTD., Rehovot (IL)

(72) Inventors: Igal Ben-Dayan, Moshav Kochav Michael (IL); Almog Koren, Beer Sheva (IL); Ittai Wiener, Mevaseret Zion (IL); Yevgeny Zakharin, Petah Tikva (IL)

(73) Assignee: Landa Corporation Ltd., Rehovot (IL)

( * ) Notice: Subject to any disclaimer, the term of this patent is extended or adjusted under 35 U.S.C. 154(b) by 175 days.

(21) Appl. No.: 18/261,852

(22) PCT Filed: Jan. 16, 2022

(86) PCT No.: PCT/IB2022/050328
§ 371 (c)(1),
(2) Date: Jul. 18, 2023

(87) PCT Pub. No.: WO2022/167876
PCT Pub. Date: Aug. 11, 2022

(65) Prior Publication Data
US 2024/0075762 A1    Mar. 7, 2024

Related U.S. Application Data

(60) Provisional application No. 63/144,488, filed on Feb. 2, 2021.

(51) Int. Cl.
*B41J 2/005* (2006.01)
*B41J 2/21* (2006.01)
(Continued)

(52) U.S. Cl.
CPC .......... *G06F 21/604* (2013.01); *B41J 2/0057* (2013.01); *B41J 2/21* (2013.01); *B41J 29/38* (2013.01);
(Continued)

(58) Field of Classification Search
CPC ...... B41J 2/0057; B41J 2/01; B41J 2002/012; B41J 11/007; B41J 15/048; B41J 29/393;
(Continued)

(56) References Cited

U.S. PATENT DOCUMENTS 2,839,181 A    6/1958  Renner
3,011,545 A    12/1961 Welsh et al.
(Continued)

FOREIGN PATENT DOCUMENTS

CN    1121033 A    4/1996
CN    1200085 A    11/1998
(Continued)

OTHER PUBLICATIONS

FR3062340A1 Machine Translation (by EPO and Google)—published Aug. 3, 2018; MGI Digital Tech [FR].
(Continued)

*Primary Examiner* — John Zimmermann
(74) *Attorney, Agent, or Firm* — Meitar Patents Ltd.; Daniel Kligler

(57) ABSTRACT

A method including receiving a first signal indicative of a first electrical current measured on a first motion assembly (77) for moving a flexible substrate (44) that receives droplets of a printing fluid from an image forming station (60) to form an image thereon. A second signal indicative of a second electrical current measured on a second motion assembly (99) for moving the flexible substrate (44), is received, wherein a section of the flexible substrate (44) is moving between the first motion assembly (77) and the
(Continued)

second motion assembly (99). A parameter, which is indicative of a distortion in the image, is calculated based on the first signal and the second signal. In response to detecting, based on the parameter, an increase in the distortion, a corrective action is applied to reduce the distortion.

18 Claims, 3 Drawing Sheets

(51) Int. Cl.
  *B41J 29/38* (2006.01)
  *G06F 3/12* (2006.01)
  *G06F 21/60* (2013.01)
(52) U.S. Cl.
  CPC .......... *G06F 3/1208* (2013.01); *G06F 3/1229* (2013.01)
(58) Field of Classification Search
  CPC ....... G03G 15/1615; G03G 2215/1623; B41M 2205/10; B41M 5/0256
  See application file for complete search history.

(56) References Cited

U.S. PATENT DOCUMENTS

| | | |
|---|---|---|
| 3,053,319 A | 9/1962 | Cronin et al. |
| 3,697,551 A | 10/1972 | Thomson |
| 3,697,568 A | 10/1972 | Boissieras et al. |
| 3,889,802 A | 6/1975 | Jonkers |
| 3,898,670 A | 8/1975 | Erikson et al. |
| 3,947,113 A | 3/1976 | Buchan et al. |
| 4,009,958 A | 3/1977 | Kurita et al. |
| 4,093,764 A | 6/1978 | Duckett et al. |
| 4,172,231 A | 10/1979 | D'Alayer et al. |
| 4,293,866 A | 10/1981 | Takita et al. |
| 4,401,500 A | 8/1983 | Hamada et al. |
| 4,535,694 A | 8/1985 | Fukuda |
| 4,538,156 A | 8/1985 | Durkee et al. |
| 4,555,437 A | 11/1985 | Tanck |
| 4,575,465 A | 3/1986 | Viola |
| 4,586,807 A | 5/1986 | Yuasa |
| 4,642,654 A | 2/1987 | Toganoh et al. |
| 4,853,737 A | 8/1989 | Hartley et al. |
| 4,976,197 A | 12/1990 | Yamanari et al. |
| 5,012,072 A | 4/1991 | Martin et al. |
| 5,039,339 A | 8/1991 | Phan et al. |
| 5,062,364 A | 11/1991 | Lewis et al. |
| 5,075,731 A | 12/1991 | Kamimura et al. |
| 5,099,256 A | 3/1992 | Anderson |
| 5,106,417 A | 4/1992 | Hauser et al. |
| 5,109,275 A | 4/1992 | Naka et al. |
| 5,128,091 A | 7/1992 | Agur et al. |
| 5,190,582 A | 3/1993 | Shinozuka et al. |
| 5,198,835 A | 3/1993 | Ando et al. |
| 5,246,100 A | 9/1993 | Stone et al. |
| 5,264,904 A | 11/1993 | Audi et al. |
| 5,305,099 A | 4/1994 | Morcos |
| 5,320,214 A | 6/1994 | Kordis |
| 5,333,771 A | 8/1994 | Cesario |
| 5,349,905 A | 9/1994 | Taylor et al. |
| 5,352,507 A | 10/1994 | Bresson et al. |
| 5,365,324 A | 11/1994 | Gu et al. |
| 5,406,884 A | 4/1995 | Okuda et al. |
| 5,433,541 A | 7/1995 | Hieda et al. |
| 5,471,233 A | 11/1995 | Okamoto et al. |
| 5,532,314 A | 7/1996 | Sexsmith |
| 5,552,875 A | 9/1996 | Sagiv et al. |
| 5,575,873 A | 11/1996 | Pieper et al. |
| 5,587,779 A | 12/1996 | Heeren et al. |
| 5,608,004 A | 3/1997 | Toyoda et al. |
| 5,613,669 A | 3/1997 | Grueninger |
| 5,614,933 A | 3/1997 | Hindman et al. |
| 5,623,296 A | 4/1997 | Fujino et al. |
| 5,642,141 A | 6/1997 | Hale et al. |
| 5,660,108 A | 8/1997 | Pensavecchia |
| 5,677,719 A | 10/1997 | Granzow |
| 5,679,463 A | 10/1997 | Visser et al. |
| 5,683,841 A | 11/1997 | Kato |
| 5,698,018 A | 12/1997 | Bishop et al. |
| 5,723,242 A | 3/1998 | Woo et al. |
| 5,733,698 A | 3/1998 | Lehman et al. |
| 5,736,250 A | 4/1998 | Heeks et al. |
| 5,772,746 A | 6/1998 | Sawada et al. |
| 5,777,576 A | 7/1998 | Zur et al. |
| 5,777,650 A | 7/1998 | Blank |
| 5,780,412 A | 7/1998 | Scarborough et al. |
| 5,841,456 A | 11/1998 | Takei et al. |
| 5,859,076 A | 1/1999 | Kozma et al. |
| 5,865,299 A | 2/1999 | Williams |
| 5,880,214 A | 3/1999 | Okuda |
| 5,883,144 A | 3/1999 | Bambara et al. |
| 5,883,145 A | 3/1999 | Hurley et al. |
| 5,884,559 A | 3/1999 | Okubo et al. |
| 5,889,534 A | 3/1999 | Johnson et al. |
| 5,891,934 A | 4/1999 | Moffatt et al. |
| 5,895,711 A | 4/1999 | Yamaki et al. |
| 5,902,841 A | 5/1999 | Jaeger et al. |
| 5,923,929 A | 7/1999 | Ben et al. |
| 5,929,129 A | 7/1999 | Feichtinger |
| 5,932,659 A | 8/1999 | Bambara et al. |
| 5,935,751 A | 8/1999 | Matsuoka et al. |
| 5,978,631 A | 11/1999 | Lee |
| 5,978,638 A | 11/1999 | Tanaka et al. |
| 5,991,590 A | 11/1999 | Chang et al. |
| 6,004,647 A | 12/1999 | Bambara et al. |
| 6,009,284 A | 12/1999 | Weinberger et al. |
| 6,024,018 A | 2/2000 | Darel et al. |
| 6,024,786 A | 2/2000 | Gore |
| 6,033,049 A | 3/2000 | Fukuda |
| 6,045,817 A | 4/2000 | Ananthapadmanabhan et al. |
| 6,048,114 A | 4/2000 | De Troz |
| 6,053,438 A | 4/2000 | Romano, Jr. et al. |
| 6,055,396 A | 4/2000 | Pang |
| 6,059,407 A | 5/2000 | Komatsu et al. |
| 6,071,368 A | 6/2000 | Boyd et al. |
| 6,072,976 A | 6/2000 | Kuriyama et al. |
| 6,078,775 A | 6/2000 | Arai et al. |
| 6,094,558 A | 7/2000 | Shimizu et al. |
| 6,102,538 A | 8/2000 | Ochi et al. |
| 6,103,775 A | 8/2000 | Bambara et al. |
| 6,108,513 A | 8/2000 | Landa et al. |
| 6,109,746 A | 8/2000 | Jeanmaire et al. |
| 6,132,541 A | 10/2000 | Heaton |
| 6,143,807 A | 11/2000 | Lin et al. |
| 6,166,105 A | 12/2000 | Santilli et al. |
| 6,195,112 B1 | 2/2001 | Fassler et al. |
| 6,196,674 B1 | 3/2001 | Takemoto |
| 6,213,580 B1 | 4/2001 | Segerstrom et al. |
| 6,214,894 B1 | 4/2001 | Bambara et al. |
| 6,221,928 B1 | 4/2001 | Kozma et al. |
| 6,234,625 B1 | 5/2001 | Wen |
| 6,242,503 B1 | 6/2001 | Kozma et al. |
| 6,257,716 B1 | 7/2001 | Yanagawa et al. |
| 6,261,688 B1 | 7/2001 | Kaplan et al. |
| 6,262,137 B1 | 7/2001 | Kozma et al. |
| 6,262,207 B1 | 7/2001 | Rao et al. |
| 6,303,215 B1 | 10/2001 | Sonobe et al. |
| 6,316,512 B1 | 11/2001 | Bambara et al. |
| 6,318,853 B1 | 11/2001 | Asano et al. |
| 6,332,943 B1 | 12/2001 | Herrmann et al. |
| 6,335,046 B1 | 1/2002 | Mackey |
| 6,354,700 B1 | 3/2002 | Roth |
| 6,357,869 B1 | 3/2002 | Rasmussen et al. |
| 6,357,870 B1 | 3/2002 | Beach et al. |
| 6,358,660 B1 | 3/2002 | Agler et al. |
| 6,363,234 B2 | 3/2002 | Landa et al. |
| 6,364,451 B1 | 4/2002 | Silverbrook |
| 6,377,772 B1 | 4/2002 | Chowdry et al. |
| 6,383,278 B1 | 5/2002 | Hirasa et al. |
| 6,386,697 B1 | 5/2002 | Yamamoto et al. |
| 6,390,617 B1 | 5/2002 | Iwao |
| 6,396,528 B1 | 5/2002 | Yanagawa |

(56) References Cited

U.S. PATENT DOCUMENTS

| | | |
|---|---|---|
| 6,397,034 B1 | 5/2002 | Tarnawskyj et al. |
| 6,400,913 B1 | 6/2002 | De Jong et al. |
| 6,402,317 B2 | 6/2002 | Yanagawa et al. |
| 6,405,006 B1 | 6/2002 | Tabuchi |
| 6,409,331 B1 | 6/2002 | Gelbart |
| 6,432,501 B1 | 8/2002 | Yang et al. |
| 6,438,352 B1 | 8/2002 | Landa et al. |
| 6,454,378 B1 | 9/2002 | Silverbrook et al. |
| 6,471,803 B1 | 10/2002 | Pelland et al. |
| 6,530,321 B2 | 3/2003 | Andrew et al. |
| 6,530,657 B2 | 3/2003 | Polierer |
| 6,531,520 B1 | 3/2003 | Bambara et al. |
| 6,551,394 B2 | 4/2003 | Hirasa et al. |
| 6,551,716 B1 | 4/2003 | Landa et al. |
| 6,554,189 B1 | 4/2003 | Good et al. |
| 6,559,969 B1 | 5/2003 | Lapstun |
| 6,575,547 B2 | 6/2003 | Sakuma |
| 6,586,100 B1 | 7/2003 | Pickering et al. |
| 6,590,012 B2 | 7/2003 | Miyabayashi |
| 6,605,919 B1 | 8/2003 | Branecky |
| 6,608,979 B1 | 8/2003 | Landa et al. |
| 6,623,817 B1 | 9/2003 | Yang et al. |
| 6,630,047 B2 | 10/2003 | Jing et al. |
| 6,633,735 B2 | 10/2003 | Kellie et al. |
| 6,639,527 B2 | 10/2003 | Johnson |
| 6,648,468 B2 | 11/2003 | Shinkoda et al. |
| 6,678,068 B1 | 1/2004 | Richter et al. |
| 6,682,189 B2 | 1/2004 | May et al. |
| 6,685,769 B1 | 2/2004 | Karl et al. |
| 6,704,535 B2 | 3/2004 | Kobayashi et al. |
| 6,709,096 B1 | 3/2004 | Beach et al. |
| 6,716,562 B2 | 4/2004 | Uehara et al. |
| 6,719,423 B2 | 4/2004 | Chowdry et al. |
| 6,720,367 B2 | 4/2004 | Taniguchi et al. |
| 6,755,519 B2 | 6/2004 | Gelbart et al. |
| 6,761,446 B2 | 7/2004 | Chowdry et al. |
| 6,770,331 B1 | 8/2004 | Mielke et al. |
| 6,789,887 B2 | 9/2004 | Yang et al. |
| 6,811,840 B1 | 11/2004 | Cross |
| 6,827,018 B1 | 12/2004 | Hartmann et al. |
| 6,881,458 B2 | 4/2005 | Ludwig et al. |
| 6,898,403 B2 | 5/2005 | Baker et al. |
| 6,912,952 B1 | 7/2005 | Landa et al. |
| 6,916,862 B2 | 7/2005 | Ota et al. |
| 6,917,437 B1 | 7/2005 | Myers et al. |
| 6,966,712 B2 | 11/2005 | Trelewicz et al. |
| 6,970,674 B2 | 11/2005 | Sato et al. |
| 6,974,022 B2 | 12/2005 | Saeki |
| 6,982,799 B2 | 1/2006 | Lapstun |
| 6,983,692 B2 | 1/2006 | Beauchamp et al. |
| 7,025,453 B2 | 4/2006 | Ylitalo et al. |
| 7,057,760 B2 | 6/2006 | Lapstun et al. |
| 7,084,202 B2 | 8/2006 | Pickering et al. |
| 7,128,412 B2 | 10/2006 | King et al. |
| 7,129,858 B2 | 10/2006 | Ferran et al. |
| 7,134,953 B2 | 11/2006 | Reinke |
| 7,160,377 B2 | 1/2007 | Zoch et al. |
| 7,204,584 B2 | 4/2007 | Lean et al. |
| 7,213,900 B2 | 5/2007 | Ebihara |
| 7,224,478 B1 | 5/2007 | Lapstun et al. |
| 7,265,819 B2 | 9/2007 | Raney |
| 7,271,213 B2 | 9/2007 | Hoshida et al. |
| 7,296,882 B2 | 11/2007 | Buehler et al. |
| 7,300,133 B1 | 11/2007 | Folkins et al. |
| 7,300,147 B2 | 11/2007 | Johnson |
| 7,304,753 B1 | 12/2007 | Richter et al. |
| 7,322,689 B2 | 1/2008 | Kohne et al. |
| 7,334,520 B2 | 2/2008 | Geissler et al. |
| 7,348,368 B2 | 3/2008 | Kakiuchi et al. |
| 7,360,887 B2 | 4/2008 | Konno |
| 7,362,464 B2 | 4/2008 | Kitazawa |
| 7,459,491 B2 | 12/2008 | Tyvoll et al. |
| 7,494,213 B2 | 2/2009 | Taniuchi et al. |
| 7,527,359 B2 | 5/2009 | Stevenson et al. |
| 7,575,314 B2 | 8/2009 | Desie et al. |
| 7,612,125 B2 | 11/2009 | Muller et al. |
| 7,655,707 B2 | 2/2010 | Ma |
| 7,655,708 B2 | 2/2010 | House et al. |
| 7,699,922 B2 | 4/2010 | Breton et al. |
| 7,708,371 B2 | 5/2010 | Yamanobe |
| 7,709,074 B2 | 5/2010 | Uchida et al. |
| 7,712,890 B2 | 5/2010 | Yahiro |
| 7,732,543 B2 | 6/2010 | Loch et al. |
| 7,732,583 B2 | 6/2010 | Annoura et al. |
| 7,808,670 B2 | 10/2010 | Lapstun et al. |
| 7,810,922 B2 | 10/2010 | Gervasi et al. |
| 7,845,788 B2 | 12/2010 | Oku |
| 7,867,327 B2 | 1/2011 | Sano et al. |
| 7,876,345 B2 | 1/2011 | Houjou |
| 7,910,183 B2 | 3/2011 | Wu |
| 7,911,644 B2 | 3/2011 | Shiokawa |
| 7,919,544 B2 | 4/2011 | Matsuyama et al. |
| 7,942,516 B2 | 5/2011 | Ohara et al. |
| 7,977,408 B2 | 7/2011 | Matsuyama et al. |
| 7,985,784 B2 | 7/2011 | Kanaya et al. |
| 8,002,400 B2 | 8/2011 | Kibayashi et al. |
| 8,012,538 B2 | 9/2011 | Yokouchi |
| 8,025,389 B2 | 9/2011 | Yamanobe et al. |
| 8,038,284 B2 | 10/2011 | Hori et al. |
| 8,041,275 B2 | 10/2011 | Soria et al. |
| 8,042,906 B2 | 10/2011 | Chiwata et al. |
| 8,059,309 B2 | 11/2011 | Lapstun et al. |
| 8,095,054 B2 | 1/2012 | Nakamura |
| 8,109,595 B2 | 2/2012 | Tanaka et al. |
| 8,119,315 B1 | 2/2012 | Heuft et al. |
| 8,122,846 B2 | 2/2012 | Stiblert et al. |
| 8,147,055 B2 | 4/2012 | Cellura et al. |
| 8,162,428 B2 | 4/2012 | Eun et al. |
| 8,177,351 B2 | 5/2012 | Taniuchi et al. |
| 8,184,347 B2 | 5/2012 | Bradley |
| 8,186,820 B2 | 5/2012 | Chiwata |
| 8,192,904 B2 | 6/2012 | Nagai et al. |
| 8,215,762 B2 | 7/2012 | Ageishi |
| 8,242,201 B2 | 8/2012 | Goto et al. |
| 8,256,857 B2 | 9/2012 | Folkins et al. |
| 8,263,683 B2 | 9/2012 | Gibson et al. |
| 8,264,135 B2 | 9/2012 | Ozolins et al. |
| 8,295,733 B2 | 10/2012 | Imoto |
| 8,303,071 B2 | 11/2012 | Eun |
| 8,303,072 B2 | 11/2012 | Shibata et al. |
| 8,304,043 B2 | 11/2012 | Nagashima et al. |
| 8,353,589 B2 | 1/2013 | Ikeda et al. |
| 8,362,108 B2 | 1/2013 | Imai |
| 8,434,847 B2 | 5/2013 | Dejong et al. |
| 8,460,450 B2 | 6/2013 | Taverizatshy et al. |
| 8,469,476 B2 | 6/2013 | Mandel et al. |
| 8,474,963 B2 | 7/2013 | Hasegawa et al. |
| 8,536,268 B2 | 9/2013 | Karjala et al. |
| 8,546,466 B2 | 10/2013 | Yamashita et al. |
| 8,556,400 B2 | 10/2013 | Yatake et al. |
| 8,693,032 B2 | 4/2014 | Goddard et al. |
| 8,711,304 B2 | 4/2014 | Mathew et al. |
| 8,714,731 B2 | 5/2014 | Leung et al. |
| 8,746,873 B2 | 6/2014 | Tsukamoto et al. |
| 8,779,027 B2 | 7/2014 | Idemura et al. |
| 8,802,221 B2 | 8/2014 | Noguchi et al. |
| 8,867,097 B2 | 10/2014 | Mizuno |
| 8,885,218 B2 | 11/2014 | Hirose |
| 8,891,128 B2 | 11/2014 | Yamazaki |
| 8,894,198 B2 | 11/2014 | Hook et al. |
| 8,919,946 B2 | 12/2014 | Suzuki et al. |
| 8,939,573 B2 | 1/2015 | Kanasugi et al. |
| 9,004,629 B2 | 4/2015 | De Jong et al. |
| 9,186,884 B2 | 11/2015 | Landa et al. |
| 9,207,585 B2 | 12/2015 | Hatano et al. |
| 9,227,429 B1 | 1/2016 | LeStrange et al. |
| 9,229,664 B2 | 1/2016 | Landa et al. |
| 9,264,559 B2 | 2/2016 | Motoyanagi et al. |
| 9,284,469 B2 | 3/2016 | Song et al. |
| 9,290,016 B2 | 3/2016 | Landa et al. |
| 9,327,496 B2 | 5/2016 | Landa et al. |
| 9,327,519 B1 | 5/2016 | Larson et al. |
| 9,353,273 B2 | 5/2016 | Landa et al. |
| 9,381,736 B2 | 7/2016 | Landa et al. |

(56) References Cited

U.S. PATENT DOCUMENTS

| | | |
|---|---|---|
| 9,446,586 B2 | 9/2016 | Matos et al. |
| 9,498,946 B2 | 11/2016 | Landa et al. |
| 9,505,208 B2 | 11/2016 | Shmaiser et al. |
| 9,517,618 B2 | 12/2016 | Landa et al. |
| 9,566,780 B2 | 2/2017 | Landa et al. |
| 9,568,862 B2 | 2/2017 | Shmaiser et al. |
| 9,573,361 B2 | 2/2017 | Tsuji et al. |
| 9,643,400 B2 | 5/2017 | Landa et al. |
| 9,643,403 B2 | 5/2017 | Landa et al. |
| 9,776,391 B2 | 10/2017 | Landa et al. |
| 9,782,993 B2 | 10/2017 | Landa et al. |
| 9,849,667 B2 | 12/2017 | Landa et al. |
| 9,884,479 B2 | 2/2018 | Landa et al. |
| 9,902,147 B2 | 2/2018 | Shmaiser et al. |
| 9,914,316 B2 | 3/2018 | Landa et al. |
| 10,065,411 B2 | 9/2018 | Landa et al. |
| 10,175,613 B2 | 1/2019 | Watanabe |
| 10,179,447 B2 | 1/2019 | Shmaiser et al. |
| 10,190,012 B2 | 1/2019 | Landa et al. |
| 10,195,843 B2 | 2/2019 | Landa et al. |
| 10,201,968 B2 | 2/2019 | Landa et al. |
| 10,226,920 B2 | 3/2019 | Shmaiser et al. |
| 10,266,711 B2 | 4/2019 | Landa et al. |
| 10,289,874 B2 | 5/2019 | Smith |
| 10,300,690 B2 | 5/2019 | Landa et al. |
| 10,357,963 B2 | 7/2019 | Landa et al. |
| 10,357,985 B2 | 7/2019 | Landa et al. |
| 10,427,399 B2 | 10/2019 | Shmaiser et al. |
| 10,434,761 B2 | 10/2019 | Landa et al. |
| 10,477,188 B2 | 11/2019 | Stiglic et al. |
| 10,518,526 B2 | 12/2019 | Landa et al. |
| 10,569,532 B2 | 2/2020 | Shmaiser et al. |
| 10,569,533 B2 | 2/2020 | Landa et al. |
| 10,569,534 B2 | 2/2020 | Shmaiser et al. |
| 10,576,734 B2 | 3/2020 | Landa et al. |
| 10,596,804 B2 | 3/2020 | Landa et al. |
| 10,632,740 B2 | 4/2020 | Landa et al. |
| 10,642,198 B2 | 5/2020 | Landa et al. |
| 10,703,094 B2 | 7/2020 | Shmaiser et al. |
| 10,730,333 B2 | 8/2020 | Landa et al. |
| 10,739,705 B2 * | 8/2020 | Stowitts ............... B41F 17/002 |
| 10,759,953 B2 | 9/2020 | Landa et al. |
| 10,800,936 B2 | 10/2020 | Landa et al. |
| 10,828,888 B2 | 11/2020 | Landa et al. |
| 10,884,349 B2 | 1/2021 | Landa et al. |
| 10,889,128 B2 | 1/2021 | Landa et al. |
| 10,926,532 B2 | 2/2021 | Chechik et al. |
| 10,933,661 B2 | 3/2021 | Landa et al. |
| 10,960,660 B2 | 3/2021 | Landa et al. |
| 10,981,377 B2 | 4/2021 | Landa et al. |
| 10,994,528 B1 | 5/2021 | Burkatovsky |
| 11,104,123 B2 | 8/2021 | Shmaiser et al. |
| 11,106,161 B2 | 8/2021 | Landa et al. |
| 11,179,928 B2 | 11/2021 | Shmaiser et al. |
| 11,196,984 B2 | 12/2021 | Stiglic et al. |
| 11,203,199 B2 | 12/2021 | Landa et al. |
| 11,214,089 B2 | 1/2022 | Landa et al. |
| 11,235,568 B2 | 2/2022 | Landa et al. |
| 11,267,239 B2 | 3/2022 | Pomerantz et al. |
| 11,285,715 B2 | 3/2022 | Landa et al. |
| 11,318,734 B2 | 5/2022 | Chechik et al. |
| 11,321,028 B2 | 5/2022 | Levant |
| 11,327,413 B2 | 5/2022 | Landa et al. |
| 11,396,190 B2 | 7/2022 | Landa et al. |
| 11,465,426 B2 | 10/2022 | Landa et al. |
| 11,511,536 B2 | 11/2022 | Burkatovsky |
| 11,548,275 B2 | 1/2023 | Burkatovsky |
| 11,559,982 B2 | 1/2023 | Landa et al. |
| 11,607,878 B2 | 3/2023 | Shmaiser et al. |
| 11,623,440 B2 | 4/2023 | Chechik et al. |
| 11,628,674 B2 | 4/2023 | Landa et al. |
| 11,630,618 B2 | 4/2023 | Levant |
| 11,655,382 B2 | 5/2023 | Landa et al. |
| 11,660,856 B2 | 5/2023 | Pomerantz et al. |
| 11,660,857 B2 | 5/2023 | Landa et al. |
| 11,679,615 B2 | 6/2023 | Landa et al. |
| 11,707,943 B2 | 7/2023 | Levanon et al. |
| 11,713,399 B2 | 8/2023 | Landa et al. |
| 11,724,487 B2 | 8/2023 | Landa et al. |
| 11,724,488 B2 | 8/2023 | Landa et al. |
| 2001/0022607 A1 | 9/2001 | Takahashi et al. |
| 2001/0033688 A1 | 10/2001 | Taylor |
| 2002/0041317 A1 | 4/2002 | Kashiwazaki et al. |
| 2002/0061451 A1 | 5/2002 | Kita et al. |
| 2002/0064404 A1 | 5/2002 | Iwai |
| 2002/0102374 A1 | 8/2002 | Gervasi et al. |
| 2002/0121220 A1 | 9/2002 | Lin |
| 2002/0150408 A1 | 10/2002 | Mosher et al. |
| 2002/0164494 A1 | 11/2002 | Grant et al. |
| 2002/0197481 A1 | 12/2002 | Jing et al. |
| 2003/0004025 A1 | 1/2003 | Okuno et al. |
| 2003/0007055 A1 | 1/2003 | Ogawa |
| 2003/0018119 A1 | 1/2003 | Frenkel et al. |
| 2003/0030686 A1 | 2/2003 | Abe et al. |
| 2003/0032700 A1 | 2/2003 | Morrison et al. |
| 2003/0041777 A1 | 3/2003 | Karl et al. |
| 2003/0043258 A1 | 3/2003 | Kerr et al. |
| 2003/0049065 A1 | 3/2003 | Barrus et al. |
| 2003/0054139 A1 | 3/2003 | Ylitalo et al. |
| 2003/0055129 A1 | 3/2003 | Alford |
| 2003/0063179 A1 | 4/2003 | Adachi |
| 2003/0064317 A1 | 4/2003 | Bailey et al. |
| 2003/0081964 A1 | 5/2003 | Shimura et al. |
| 2003/0118381 A1 | 6/2003 | Law et al. |
| 2003/0129435 A1 | 7/2003 | Blankenship et al. |
| 2003/0175602 A1 | 9/2003 | Kazama |
| 2003/0186147 A1 | 10/2003 | Pickering et al. |
| 2003/0214568 A1 | 11/2003 | Nishikawa et al. |
| 2003/0234849 A1 | 12/2003 | Pan et al. |
| 2004/0003863 A1 | 1/2004 | Eckhardt |
| 2004/0020382 A1 | 2/2004 | McLean et al. |
| 2004/0036758 A1 | 2/2004 | Sasaki et al. |
| 2004/0047666 A1 | 3/2004 | Imaizumi et al. |
| 2004/0087707 A1 | 5/2004 | Zoch et al. |
| 2004/0123761 A1 | 7/2004 | Szumla et al. |
| 2004/0124831 A1 | 7/2004 | Micke et al. |
| 2004/0125188 A1 | 7/2004 | Szumla et al. |
| 2004/0145643 A1 | 7/2004 | Nakamura |
| 2004/0173111 A1 | 9/2004 | Okuda |
| 2004/0200369 A1 | 10/2004 | Brady |
| 2004/0221943 A1 | 11/2004 | Yu et al. |
| 2004/0228642 A1 | 11/2004 | Iida et al. |
| 2004/0246324 A1 | 12/2004 | Nakashima |
| 2004/0246326 A1 | 12/2004 | Dwyer et al. |
| 2004/0252175 A1 | 12/2004 | Bejat et al. |
| 2004/0265016 A1 | 12/2004 | Kitani et al. |
| 2005/0031807 A1 | 2/2005 | Quintens et al. |
| 2005/0082146 A1 | 4/2005 | Axmann |
| 2005/0110855 A1 | 5/2005 | Taniuchi et al. |
| 2005/0111861 A1 | 5/2005 | Calamita et al. |
| 2005/0134874 A1 * | 6/2005 | Overall ................ G03G 15/01 358/1.9 |
| 2005/0150408 A1 | 7/2005 | Hesterman |
| 2005/0185009 A1 | 8/2005 | Claramunt et al. |
| 2005/0195235 A1 | 9/2005 | Kitao |
| 2005/0235870 A1 | 10/2005 | Ishihara |
| 2005/0266332 A1 | 12/2005 | Pavlisko et al. |
| 2005/0272334 A1 | 12/2005 | Wang et al. |
| 2006/0004123 A1 | 1/2006 | Wu et al. |
| 2006/0066704 A1 | 3/2006 | Nishida |
| 2006/0120740 A1 | 6/2006 | Yamada et al. |
| 2006/0135709 A1 | 6/2006 | Hasegawa et al. |
| 2006/0164489 A1 | 7/2006 | Vega et al. |
| 2006/0192827 A1 | 8/2006 | Takada et al. |
| 2006/0233578 A1 | 10/2006 | Maki et al. |
| 2006/0286462 A1 | 12/2006 | Jackson et al. |
| 2007/0014595 A1 | 1/2007 | Kawagoe |
| 2007/0025768 A1 | 2/2007 | Komatsu et al. |
| 2007/0029171 A1 | 2/2007 | Nemedi |
| 2007/0045939 A1 | 3/2007 | Toya et al. |
| 2007/0054981 A1 | 3/2007 | Yanagi et al. |
| 2007/0064077 A1 | 3/2007 | Konno |
| 2007/0077520 A1 | 4/2007 | Maemoto |
| 2007/0120927 A1 | 5/2007 | Snyder et al. |

(56) References Cited

U.S. PATENT DOCUMENTS

| | | |
|---|---|---|
| 2007/0123642 A1 | 5/2007 | Banning et al. |
| 2007/0134030 A1 | 6/2007 | Lior et al. |
| 2007/0139734 A1 | 6/2007 | Fan et al. |
| 2007/0144368 A1 | 6/2007 | Barazani et al. |
| 2007/0146462 A1 | 6/2007 | Taniuchi et al. |
| 2007/0147894 A1 | 6/2007 | Yokota et al. |
| 2007/0166071 A1 | 7/2007 | Shima |
| 2007/0176995 A1 | 8/2007 | Kadomatsu et al. |
| 2007/0189819 A1 | 8/2007 | Uehara et al. |
| 2007/0195348 A1 | 8/2007 | Gerrits et al. |
| 2007/0199457 A1 | 8/2007 | Cyman et al. |
| 2007/0229639 A1 | 10/2007 | Yahiro |
| 2007/0253726 A1 | 11/2007 | Kagawa |
| 2007/0257955 A1 | 11/2007 | Tanaka et al. |
| 2007/0285486 A1 | 12/2007 | Harris et al. |
| 2008/0006176 A1 | 1/2008 | Houjou |
| 2008/0030536 A1 | 2/2008 | Furukawa et al. |
| 2008/0032072 A1 | 2/2008 | Taniuchi et al. |
| 2008/0044587 A1 | 2/2008 | Maeno et al. |
| 2008/0053327 A1 | 3/2008 | Weilacher |
| 2008/0055356 A1 | 3/2008 | Yamanobe |
| 2008/0055381 A1 | 3/2008 | Doi et al. |
| 2008/0074462 A1 | 3/2008 | Hirakawa |
| 2008/0112912 A1 | 5/2008 | Springob et al. |
| 2008/0124158 A1 | 5/2008 | Folkins |
| 2008/0137914 A1 | 6/2008 | Minhas |
| 2008/0138546 A1 | 6/2008 | Soria et al. |
| 2008/0166495 A1 | 7/2008 | Maeno et al. |
| 2008/0167185 A1 | 7/2008 | Hirota |
| 2008/0175612 A1 | 7/2008 | Oikawa et al. |
| 2008/0196612 A1 | 8/2008 | Rancourt et al. |
| 2008/0196621 A1 | 8/2008 | Ikuno et al. |
| 2008/0213548 A1 | 9/2008 | Koganehira et al. |
| 2008/0236480 A1 | 10/2008 | Furukawa et al. |
| 2008/0253812 A1 | 10/2008 | Pearce et al. |
| 2009/0022504 A1 | 1/2009 | Kuwabara et al. |
| 2009/0039583 A1 | 2/2009 | Horn et al. |
| 2009/0041515 A1 | 2/2009 | Kim |
| 2009/0041932 A1 | 2/2009 | Ishizuka et al. |
| 2009/0064884 A1 | 3/2009 | Hook et al. |
| 2009/0074492 A1 | 3/2009 | Ito |
| 2009/0082503 A1 | 3/2009 | Yanagi et al. |
| 2009/0087565 A1 | 4/2009 | Houjou |
| 2009/0098385 A1 | 4/2009 | Kaemper et al. |
| 2009/0116885 A1 | 5/2009 | Ando |
| 2009/0148200 A1 | 6/2009 | Hara et al. |
| 2009/0165937 A1 | 7/2009 | Inoue et al. |
| 2009/0185204 A1 | 7/2009 | Wu et al. |
| 2009/0190951 A1 | 7/2009 | Torimaru et al. |
| 2009/0196670 A1 | 8/2009 | McNestry et al. |
| 2009/0202275 A1 | 8/2009 | Nishida et al. |
| 2009/0211490 A1 | 8/2009 | Ikuno et al. |
| 2009/0220873 A1 | 9/2009 | Enomoto et al. |
| 2009/0237479 A1 | 9/2009 | Yamashita et al. |
| 2009/0256896 A1 | 10/2009 | Scarlata |
| 2009/0279170 A1 | 11/2009 | Miyazaki et al. |
| 2009/0279780 A1 | 11/2009 | Matsui |
| 2009/0315926 A1 | 12/2009 | Yamanobe |
| 2009/0317555 A1 | 12/2009 | Hori |
| 2009/0318591 A1 | 12/2009 | Ageishi et al. |
| 2010/0012023 A1 | 1/2010 | Lefevre et al. |
| 2010/0053292 A1 | 3/2010 | Thayer et al. |
| 2010/0053293 A1 | 3/2010 | Thayer et al. |
| 2010/0066796 A1 | 3/2010 | Yanagi et al. |
| 2010/0075843 A1 | 3/2010 | Ikuno et al. |
| 2010/0086692 A1 | 4/2010 | Ohta et al. |
| 2010/0091064 A1 | 4/2010 | Araki et al. |
| 2010/0141985 A1 | 6/2010 | Noy et al. |
| 2010/0225695 A1 | 9/2010 | Fujikura |
| 2010/0231623 A1 | 9/2010 | Hirato |
| 2010/0239789 A1 | 9/2010 | Umeda |
| 2010/0245511 A1 | 9/2010 | Ageishi |
| 2010/0247171 A1 | 9/2010 | Ono et al. |
| 2010/0282100 A1 | 11/2010 | Okuda et al. |
| 2010/0285221 A1 | 11/2010 | Oki et al. |
| 2010/0300604 A1 | 12/2010 | Goss et al. |
| 2010/0303504 A1 | 12/2010 | Funamoto et al. |
| 2010/0310281 A1 | 12/2010 | Miura et al. |
| 2011/0044724 A1 | 2/2011 | Funamoto et al. |
| 2011/0058001 A1 | 3/2011 | Gila et al. |
| 2011/0058859 A1 | 3/2011 | Nakamatsu et al. |
| 2011/0069110 A1 | 3/2011 | Matsumoto et al. |
| 2011/0069117 A1 | 3/2011 | Ohzeki et al. |
| 2011/0069129 A1 | 3/2011 | Shimizu |
| 2011/0085828 A1 | 4/2011 | Kosako et al. |
| 2011/0128300 A1 | 6/2011 | Gay et al. |
| 2011/0141188 A1 | 6/2011 | Morita |
| 2011/0149002 A1 | 6/2011 | Kessler |
| 2011/0150509 A1 | 6/2011 | Komiya |
| 2011/0150541 A1 | 6/2011 | Michibata |
| 2011/0169889 A1 | 7/2011 | Kojima et al. |
| 2011/0179961 A1 | 7/2011 | Yanagawa |
| 2011/0195260 A1 | 8/2011 | Lee et al. |
| 2011/0199414 A1 | 8/2011 | Lang |
| 2011/0234683 A1 | 9/2011 | Komatsu |
| 2011/0234689 A1 | 9/2011 | Saito |
| 2011/0242181 A1 | 10/2011 | Otobe |
| 2011/0249090 A1 | 10/2011 | Moore et al. |
| 2011/0279554 A1 | 11/2011 | Dannhauser et al. |
| 2011/0298884 A1 | 12/2011 | Furuta |
| 2011/0304674 A1 | 12/2011 | Sambhy et al. |
| 2012/0013693 A1 | 1/2012 | Tasaka et al. |
| 2012/0013694 A1 | 1/2012 | Kanke |
| 2012/0013928 A1 | 1/2012 | Yoshida et al. |
| 2012/0026224 A1 | 2/2012 | Anthony et al. |
| 2012/0039647 A1 | 2/2012 | Brewington et al. |
| 2012/0094091 A1 | 4/2012 | Van Mil et al. |
| 2012/0098882 A1 | 4/2012 | Onishi et al. |
| 2012/0105561 A1 | 5/2012 | Taniuchi et al. |
| 2012/0105562 A1 | 5/2012 | Sekiguchi et al. |
| 2012/0113180 A1 | 5/2012 | Tanaka et al. |
| 2012/0113203 A1 | 5/2012 | Kushida et al. |
| 2012/0127251 A1 | 5/2012 | Tsuji et al. |
| 2012/0140009 A1 | 6/2012 | Kanasugi et al. |
| 2012/0154497 A1 | 6/2012 | Nakao et al. |
| 2012/0156375 A1 | 6/2012 | Brust et al. |
| 2012/0156624 A1 | 6/2012 | Rondon et al. |
| 2012/0162302 A1 | 6/2012 | Oguchi et al. |
| 2012/0163846 A1 | 6/2012 | Andoh et al. |
| 2012/0188565 A1 | 7/2012 | Schweid et al. |
| 2012/0194830 A1 | 8/2012 | Gaertner et al. |
| 2012/0236100 A1 | 9/2012 | Toya |
| 2012/0237260 A1 | 9/2012 | Sengoku et al. |
| 2012/0287260 A1 | 11/2012 | Lu et al. |
| 2012/0301186 A1 | 11/2012 | Yang et al. |
| 2012/0314013 A1 | 12/2012 | Takemoto et al. |
| 2012/0314077 A1 | 12/2012 | Clavenna, II et al. |
| 2013/0011158 A1 | 1/2013 | Meguro et al. |
| 2013/0017006 A1 | 1/2013 | Suda |
| 2013/0033554 A1 | 2/2013 | Bouverie et al. |
| 2013/0044188 A1 | 2/2013 | Nakamura et al. |
| 2013/0057603 A1 | 3/2013 | Gordon |
| 2013/0096871 A1 | 4/2013 | Takahama |
| 2013/0120513 A1 | 5/2013 | Thayer et al. |
| 2013/0182045 A1 | 7/2013 | Ohzeki et al. |
| 2013/0201237 A1 | 8/2013 | Thomson et al. |
| 2013/0234080 A1 | 9/2013 | Torikoshi et al. |
| 2013/0242016 A1 | 9/2013 | Edwards et al. |
| 2013/0278945 A1 | 10/2013 | Ono |
| 2013/0302065 A1 | 11/2013 | Mori et al. |
| 2013/0338273 A1 | 12/2013 | Shimanaka et al. |
| 2014/0001013 A1 | 1/2014 | Takifuji et al. |
| 2014/0011125 A1 | 1/2014 | Inoue et al. |
| 2014/0043398 A1 | 2/2014 | Butler et al. |
| 2014/0104360 A1 | 4/2014 | Häcker et al. |
| 2014/0132698 A1 | 5/2014 | Lakin |
| 2014/0153956 A1 | 6/2014 | Yonemoto |
| 2014/0168330 A1 | 6/2014 | Liu et al. |
| 2014/0175707 A1 | 6/2014 | Wolk et al. |
| 2014/0198162 A1 | 7/2014 | DiRubio et al. |
| 2014/0225970 A1 | 8/2014 | Lakin et al. |
| 2014/0232782 A1 | 8/2014 | Mukai et al. |
| 2014/0267777 A1 | 9/2014 | Le et al. |
| 2014/0334855 A1 | 11/2014 | Onishi et al. |

(56) References Cited

U.S. PATENT DOCUMENTS

| | | |
|---|---|---|
| 2014/0339056 A1 | 11/2014 | Iwakoshi et al. |
| 2015/0022605 A1 | 1/2015 | Mantell et al. |
| 2015/0024648 A1 | 1/2015 | Landa et al. |
| 2015/0025179 A1 | 1/2015 | Landa et al. |
| 2015/0072090 A1 | 3/2015 | Landa et al. |
| 2015/0085036 A1 | 3/2015 | Liu et al. |
| 2015/0085037 A1 | 3/2015 | Liu et al. |
| 2015/0085038 A1 | 3/2015 | Liu |
| 2015/0116408 A1 | 4/2015 | Armbruster et al. |
| 2015/0116734 A1 | 4/2015 | Howard et al. |
| 2015/0118503 A1 | 4/2015 | Landa et al. |
| 2015/0165758 A1 | 6/2015 | Sambhy et al. |
| 2015/0195509 A1 | 7/2015 | Phipps |
| 2015/0210065 A1 | 7/2015 | Kelly et al. |
| 2015/0269719 A1 | 9/2015 | Kitai |
| 2015/0304531 A1 | 10/2015 | Rodriguez et al. |
| 2015/0315403 A1 | 11/2015 | Song et al. |
| 2015/0336378 A1 | 11/2015 | Guttmann et al. |
| 2015/0361288 A1 | 12/2015 | Song et al. |
| 2016/0031246 A1 | 2/2016 | Sreekumar et al. |
| 2016/0222232 A1 | 8/2016 | Landa et al. |
| 2016/0250879 A1 | 9/2016 | Chen et al. |
| 2016/0286462 A1 | 9/2016 | Gohite et al. |
| 2016/0375680 A1 | 12/2016 | Nishitani et al. |
| 2016/0378036 A1 | 12/2016 | Onishi et al. |
| 2017/0028688 A1 | 2/2017 | Dannhauser et al. |
| 2017/0104887 A1 | 4/2017 | Nomura |
| 2017/0364011 A1 | 12/2017 | Seki et al. |
| 2018/0149998 A1 | 5/2018 | Furukawa |
| 2018/0205853 A1 | 7/2018 | Terada |
| 2018/0257369 A1* | 9/2018 | Takeuchi ............ B41J 2/01 |
| 2018/0259888 A1 | 9/2018 | Mitsui et al. |
| 2018/0348672 A1 | 12/2018 | Yoshida |
| 2018/0348675 A1 | 12/2018 | Nakamura et al. |
| 2019/0016114 A1 | 1/2019 | Sugiyama et al. |
| 2019/0105895 A1 | 4/2019 | Muehl et al. |
| 2019/0152218 A1 | 5/2019 | Stein et al. |
| 2019/0218411 A1 | 7/2019 | Landa et al. |
| 2019/0248153 A1 | 8/2019 | Muehl et al. |
| 2020/0171813 A1 | 6/2020 | Chechik et al. |
| 2020/0210792 A1 | 7/2020 | Chen et al. |
| 2020/0238727 A1 | 7/2020 | Alacar |
| 2020/0371453 A1 | 11/2020 | Stowitts |
| 2021/0084192 A1 | 3/2021 | Kasuya et al. |
| 2021/0309020 A1 | 10/2021 | Siman Tov et al. |
| 2022/0016880 A1 | 1/2022 | Landa et al. |
| 2022/0057732 A1 | 2/2022 | Landa et al. |
| 2022/0111633 A1 | 4/2022 | Shmaiser et al. |
| 2022/0119659 A1 | 4/2022 | Landa et al. |
| 2022/0153048 A1 | 5/2022 | Landa et al. |
| 2022/0274411 A1 | 9/2022 | Chechik et al. |
| 2022/0339927 A1 | 10/2022 | Landa et al. |
| 2022/0379598 A1 | 12/2022 | Landa et al. |

FOREIGN PATENT DOCUMENTS

| | | | |
|---|---|---|---|
| CN | 1212229 A | 3/1999 | |
| CN | 1305895 A | 8/2001 | |
| CN | 1324901 A | 12/2001 | |
| CN | 1445622 A | 10/2003 | |
| CN | 1493514 A | 5/2004 | |
| CN | 1535235 A | 10/2004 | |
| CN | 1543404 A | 11/2004 | |
| CN | 1555422 A | 12/2004 | |
| CN | 1680506 A | 10/2005 | |
| CN | 1703326 A | 11/2005 | |
| CN | 1720187 A | 1/2006 | |
| CN | 1261831 C | 6/2006 | |
| CN | 1809460 A | 7/2006 | |
| CN | 1289368 C | 12/2006 | |
| CN | 101073937 A | 11/2007 | |
| CN | 101177057 A | 5/2008 | |
| CN | 101249768 A | 8/2008 | |
| CN | 101344746 A | 1/2009 | |
| CN | 101359210 A | 2/2009 | |
| CN | 101396910 A | 4/2009 | |
| CN | 101508200 A | 8/2009 | |
| CN | 101519007 A | 9/2009 | |
| CN | 101524916 A | 9/2009 | |
| CN | 101544100 A | 9/2009 | |
| CN | 101544101 A | 9/2009 | |
| CN | 101592896 A | 12/2009 | |
| CN | 101607468 A | 12/2009 | |
| CN | 201410787 Y | 2/2010 | |
| CN | 101820241 A | 9/2010 | |
| CN | 101835611 A | 9/2010 | |
| CN | 101835612 A | 9/2010 | |
| CN | 101873982 A | 10/2010 | |
| CN | 102229294 A | 11/2011 | |
| CN | 102248776 A | 11/2011 | |
| CN | 102300932 A | 12/2011 | |
| CN | 102529257 A | 7/2012 | |
| CN | 102648095 A | 8/2012 | |
| CN | 102673209 A | 9/2012 | |
| CN | 102925002 A | 2/2013 | |
| CN | 103045008 A | 4/2013 | |
| CN | 103309213 A | 9/2013 | |
| CN | 103568483 A | 2/2014 | |
| CN | 103627337 A | 3/2014 | |
| CN | 104015415 A | 9/2014 | |
| CN | 104220934 A | 12/2014 | |
| CN | 104220935 A | 12/2014 | |
| CN | 104245340 A | 12/2014 | |
| CN | 104271356 A | 1/2015 | |
| CN | 104271686 A | 1/2015 | |
| CN | 104284850 A | 1/2015 | |
| CN | 104618642 A | 5/2015 | |
| CN | 105058999 A | 11/2015 | |
| CN | 102555450 B | 3/2016 | |
| CN | 104271356 B | 10/2016 | |
| CN | 103991293 B | 1/2017 | |
| CN | 107111267 A | 8/2017 | |
| DE | 102010049945 A1 | 5/2011 | |
| DE | 102010060999 A1 | 6/2012 | |
| EP | 0457551 A2 | 11/1991 | |
| EP | 0499857 A1 | 8/1992 | |
| EP | 0606490 A1 | 7/1994 | |
| EP | 0609076 A2 | 8/1994 | |
| EP | 0613791 A2 | 9/1994 | |
| EP | 0676300 A2 | 10/1995 | |
| EP | 0530627 B1 | 3/1997 | |
| EP | 0784244 A2 | 7/1997 | |
| EP | 0835762 A1 | 4/1998 | |
| EP | 0843236 A2 | 5/1998 | |
| EP | 0854398 A2 | 7/1998 | |
| EP | 1013466 A2 | 6/2000 | |
| EP | 1146090 A2 | 10/2001 | |
| EP | 1158029 A1 | 11/2001 | |
| EP | 0825029 B1 | 5/2002 | |
| EP | 1247821 A2 | 10/2002 | |
| EP | 1271263 A1 | 1/2003 | |
| EP | 0867483 B1 | 6/2003 | |
| EP | 0923007 B1 | 3/2004 | |
| EP | 1454968 A1 | 9/2004 | |
| EP | 1503326 A1 | 2/2005 | |
| EP | 1777243 A1 | 4/2007 | |
| EP | 2028238 A2 | 2/2009 | |
| EP | 2042317 A1 | 4/2009 | |
| EP | 2065194 A2 | 6/2009 | |
| EP | 2228210 A1 | 9/2010 | |
| EP | 2270070 A1 | 1/2011 | |
| EP | 2042318 B1 | 2/2011 | |
| EP | 2042325 B1 | 2/2012 | |
| EP | 2634010 A1 | 9/2013 | |
| EP | 2683556 A1 | 1/2014 | |
| EP | 2075635 B1 | 10/2014 | |
| EP | 3260486 A1 | 12/2017 | |
| EP | 2823363 B1 | 10/2018 | |
| FR | 3062340 A1 | 8/2018 | |
| GB | 748821 A | 5/1956 | |
| GB | 1496016 A | 12/1977 | |
| GB | 1520932 A | 8/1978 | |
| GB | 1522175 A | 8/1978 | |
| GB | 2321430 A | 7/1998 | |

(56) References Cited

FOREIGN PATENT DOCUMENTS

| | | |
|---|---|---|
| JP | S4843941 B1 | 12/1973 |
| JP | S50137744 A | 11/1975 |
| JP | S5578904 A | 6/1980 |
| JP | S57121446 U | 7/1982 |
| JP | S6076343 A | 4/1985 |
| JP | S60199692 A | 10/1985 |
| JP | S6223783 A | 1/1987 |
| JP | H03248170 A | 11/1991 |
| JP | H05147208 A | 6/1993 |
| JP | H05192871 A | 8/1993 |
| JP | H05297737 A | 11/1993 |
| JP | H06954 A | 1/1994 |
| JP | H06100807 A | 4/1994 |
| JP | H06171076 A | 6/1994 |
| JP | H06345284 A | 12/1994 |
| JP | H07112841 A | 5/1995 |
| JP | H07186453 A | 7/1995 |
| JP | H07238243 A | 9/1995 |
| JP | H0862999 A | 3/1996 |
| JP | H08112970 A | 5/1996 |
| JP | 2529651 B2 | 8/1996 |
| JP | H09123432 A | 5/1997 |
| JP | H09157559 A | 6/1997 |
| JP | H09172551 A | 6/1997 |
| JP | H09281851 A | 10/1997 |
| JP | H09300678 A | 11/1997 |
| JP | H09314867 A | 12/1997 |
| JP | H10130597 A | 5/1998 |
| JP | H10207645 A | 8/1998 |
| JP | H1142811 A | 2/1999 |
| JP | H11503244 A | 3/1999 |
| JP | H11106081 A | 4/1999 |
| JP | H11138740 A | 5/1999 |
| JP | H11245383 A | 9/1999 |
| JP | 2000108320 A | 4/2000 |
| JP | 2000108334 A | 4/2000 |
| JP | 2000137595 A | 5/2000 |
| JP | 2000141710 A | 5/2000 |
| JP | 2000168062 A | 6/2000 |
| JP | 2000169772 A | 6/2000 |
| JP | 2000206801 A | 7/2000 |
| JP | 2000343025 A | 12/2000 |
| JP | 2001005245 A | 1/2001 |
| JP | 2001088430 A | 4/2001 |
| JP | 2001098201 A | 4/2001 |
| JP | 2001139865 A | 5/2001 |
| JP | 3177985 B2 | 6/2001 |
| JP | 2001164165 A | 6/2001 |
| JP | 2001199150 A | 7/2001 |
| JP | 2001206522 A | 7/2001 |
| JP | 2002020666 A | 1/2002 |
| JP | 2002049211 A | 2/2002 |
| JP | 2002504446 A | 2/2002 |
| JP | 2002069346 A | 3/2002 |
| JP | 2002103598 A | 4/2002 |
| JP | 2002169383 A | 6/2002 |
| JP | 2002229276 A | 8/2002 |
| JP | 2002234243 A | 8/2002 |
| JP | 2002278365 A | 9/2002 |
| JP | 2002292983 A | 10/2002 |
| JP | 2002304066 A | 10/2002 |
| JP | 2002326733 A | 11/2002 |
| JP | 2002371208 A | 12/2002 |
| JP | 2003057967 A | 2/2003 |
| JP | 2003076159 A | 3/2003 |
| JP | 2003094795 A | 4/2003 |
| JP | 2003114558 A | 4/2003 |
| JP | 2003145914 A | 5/2003 |
| JP | 2003183557 A | 7/2003 |
| JP | 2003211770 A | 7/2003 |
| JP | 2003219271 A | 7/2003 |
| JP | 2003246135 A | 9/2003 |
| JP | 2003246484 A | 9/2003 |
| JP | 2003267580 A | 9/2003 |
| JP | 2003292855 A | 10/2003 |
| JP | 2003295560 A | 10/2003 |
| JP | 2003313466 A | 11/2003 |
| JP | 2004009632 A | 1/2004 |
| JP | 2004011263 A | 1/2004 |
| JP | 2004019022 A | 1/2004 |
| JP | 2004025708 A | 1/2004 |
| JP | 2004034441 A | 2/2004 |
| JP | 2004077669 A | 3/2004 |
| JP | 2004114377 A | 4/2004 |
| JP | 2004114675 A | 4/2004 |
| JP | 2004148687 A | 5/2004 |
| JP | 2004167902 A | 6/2004 |
| JP | 2004231711 A | 8/2004 |
| JP | 2004524190 A | 8/2004 |
| JP | 2004261975 A | 9/2004 |
| JP | 2004318132 A | 11/2004 |
| JP | 2004325782 A | 11/2004 |
| JP | 2004340983 A | 12/2004 |
| JP | 2005014255 A | 1/2005 |
| JP | 2005014256 A | 1/2005 |
| JP | 2005017472 A | 1/2005 |
| JP | 2005114769 A | 4/2005 |
| JP | 2005215247 A | 8/2005 |
| JP | 2005307184 A | 11/2005 |
| JP | 2005319593 A | 11/2005 |
| JP | 2006001688 A | 1/2006 |
| JP | 2006023403 A | 1/2006 |
| JP | 2006095870 A | 4/2006 |
| JP | 2006102975 A | 4/2006 |
| JP | 2006137127 A | 6/2006 |
| JP | 2006143778 A | 6/2006 |
| JP | 2006152133 A | 6/2006 |
| JP | 2006224583 A | 8/2006 |
| JP | 2006231666 A | 9/2006 |
| JP | 2006234212 A | 9/2006 |
| JP | 2006243212 A | 9/2006 |
| JP | 2006263984 A | 10/2006 |
| JP | 2006347081 A | 12/2006 |
| JP | 2006347085 A | 12/2006 |
| JP | 2007025246 A | 2/2007 |
| JP | 2007041530 A | 2/2007 |
| JP | 2007069584 A | 3/2007 |
| JP | 2007079159 A | 3/2007 |
| JP | 2007174060 A | 7/2007 |
| JP | 2007190745 A | 8/2007 |
| JP | 2007216673 A | 8/2007 |
| JP | 2007253347 A | 10/2007 |
| JP | 2007298774 A | 11/2007 |
| JP | 2007334125 A | 12/2007 |
| JP | 2008006816 A | 1/2008 |
| JP | 2008018716 A | 1/2008 |
| JP | 2008019286 A | 1/2008 |
| JP | 2008036968 A | 2/2008 |
| JP | 2008082820 A | 4/2008 |
| JP | 2008137146 A | 6/2008 |
| JP | 2008137239 A | 6/2008 |
| JP | 2008139877 A | 6/2008 |
| JP | 2008142962 A | 6/2008 |
| JP | 2008183744 A | 8/2008 |
| JP | 2008194997 A | 8/2008 |
| JP | 2008532794 A | 8/2008 |
| JP | 2008201564 A | 9/2008 |
| JP | 2008238674 A | 10/2008 |
| JP | 2008246787 A | 10/2008 |
| JP | 2008246990 A | 10/2008 |
| JP | 2008254203 A | 10/2008 |
| JP | 2008255135 A | 10/2008 |
| JP | 2009040892 A | 2/2009 |
| JP | 2009045794 A | 3/2009 |
| JP | 2009045851 A | 3/2009 |
| JP | 2009045885 A | 3/2009 |
| JP | 2009083314 A | 4/2009 |
| JP | 2009083317 A | 4/2009 |
| JP | 2009083325 A | 4/2009 |
| JP | 2009096175 A | 5/2009 |
| JP | 2009148908 A | 7/2009 |
| JP | 2009154330 A | 7/2009 |
| JP | 2009190375 A | 8/2009 |
| JP | 2009202355 A | 9/2009 |

(56) References Cited

FOREIGN PATENT DOCUMENTS

| | | |
|---|---|---|
| JP | 2009214318 A | 9/2009 |
| JP | 2009214439 A | 9/2009 |
| JP | 2009532240 A | 9/2009 |
| JP | 2009226805 A | 10/2009 |
| JP | 2009226852 A | 10/2009 |
| JP | 2009226886 A | 10/2009 |
| JP | 2009226890 A | 10/2009 |
| JP | 2009227909 A | 10/2009 |
| JP | 2009233977 A | 10/2009 |
| JP | 2009234219 A | 10/2009 |
| JP | 2009240925 A | 10/2009 |
| JP | 2009271422 A | 11/2009 |
| JP | 2010005502 A | 1/2010 |
| JP | 2010005815 A | 1/2010 |
| JP | 2010030300 A | 2/2010 |
| JP | 2010054855 A | 3/2010 |
| JP | 2010510357 A | 4/2010 |
| JP | 2010105365 A | 5/2010 |
| JP | 2010173201 A | 8/2010 |
| JP | 2010184376 A | 8/2010 |
| JP | 2010214885 A | 9/2010 |
| JP | 4562388 B2 | 10/2010 |
| JP | 2010228192 A | 10/2010 |
| JP | 2010228392 A | 10/2010 |
| JP | 2010231040 A | 10/2010 |
| JP | 2010234599 A | 10/2010 |
| JP | 2010234681 A | 10/2010 |
| JP | 2010240897 A | 10/2010 |
| JP | 2010241073 A | 10/2010 |
| JP | 2010247381 A | 11/2010 |
| JP | 2010247528 A | 11/2010 |
| JP | 2010258193 A | 11/2010 |
| JP | 2010260204 A | 11/2010 |
| JP | 2010260287 A | 11/2010 |
| JP | 2010260302 A | 11/2010 |
| JP | 2010286570 A | 12/2010 |
| JP | 2011002532 A | 1/2011 |
| JP | 2011025431 A | 2/2011 |
| JP | 2011031619 A | 2/2011 |
| JP | 2011037070 A | 2/2011 |
| JP | 2011064850 A | 3/2011 |
| JP | 2011067956 A | 4/2011 |
| JP | 2011126031 A | 6/2011 |
| JP | 2011133884 A | 7/2011 |
| JP | 2011144271 A | 7/2011 |
| JP | 4743502 B2 | 8/2011 |
| JP | 2011523601 A | 8/2011 |
| JP | 2011168024 A | 9/2011 |
| JP | 2011173325 A | 9/2011 |
| JP | 2011173326 A | 9/2011 |
| JP | 2011186346 A | 9/2011 |
| JP | 2011189627 A | 9/2011 |
| JP | 2011201951 A | 10/2011 |
| JP | 2011224032 A | 11/2011 |
| JP | 2012042943 A | 3/2012 |
| JP | 2012086437 A | 5/2012 |
| JP | 2012086499 A | 5/2012 |
| JP | 2012111194 A | 6/2012 |
| JP | 2012126123 A | 7/2012 |
| JP | 2012139905 A | 7/2012 |
| JP | 2012196787 A | 10/2012 |
| JP | 2012201419 A | 10/2012 |
| JP | 2013001081 A | 1/2013 |
| JP | 2013020170 A | 1/2013 |
| JP | 2013060299 A | 4/2013 |
| JP | 2013091313 A | 5/2013 |
| JP | 2013103474 A | 5/2013 |
| JP | 2013104044 A | 5/2013 |
| JP | 2013121671 A | 6/2013 |
| JP | 2013129158 A | 7/2013 |
| JP | 2014008609 A | 1/2014 |
| JP | 2014047005 A | 3/2014 |
| JP | 2014073675 A | 4/2014 |
| JP | 2014094827 A | 5/2014 |
| JP | 2014131843 A | 7/2014 |
| JP | 2015058709 A | 3/2015 |
| JP | 2015510848 A | 4/2015 |
| JP | 2015514606 A | 5/2015 |
| JP | 2015517928 A | 6/2015 |
| JP | 2015202616 A | 11/2015 |
| JP | 2015212082 A | 11/2015 |
| JP | 2016074206 A | 5/2016 |
| JP | 2016093999 A | 5/2016 |
| JP | 2016185688 A | 10/2016 |
| JP | 2016539830 A | 12/2016 |
| JP | 2017093178 A | 5/2017 |
| JP | 2017219753 A | 12/2017 |
| JP | 6393190 B2 | 9/2018 |
| JP | 2020097239 A | 6/2020 |
| JP | 2022058755 A | 4/2022 |
| MX | 2014010683 A | 10/2014 |
| MX | 2014010680 A | 4/2015 |
| RU | 2180675 C2 | 3/2002 |
| RU | 2282643 C1 | 8/2006 |
| WO | WO-8600327 A1 | 1/1986 |
| WO | WO-9307000 A1 | 4/1993 |
| WO | WO-9401283 A1 | 1/1994 |
| WO | WO-9604339 A1 | 2/1996 |
| WO | WO-9631809 A1 | 10/1996 |
| WO | WO-9707991 A1 | 3/1997 |
| WO | WO-9736210 A1 | 10/1997 |
| WO | WO-9821251 A1 | 5/1998 |
| WO | WO-9855901 A1 | 12/1998 |
| WO | WO-9912633 A1 | 3/1999 |
| WO | WO-9942509 A1 | 8/1999 |
| WO | WO-9943502 A2 | 9/1999 |
| WO | WO-0064685 A1 | 11/2000 |
| WO | WO-0154902 A1 | 8/2001 |
| WO | WO-0170512 A1 | 9/2001 |
| WO | WO-02068191 A1 | 9/2002 |
| WO | WO-02078868 A2 | 10/2002 |
| WO | WO-02094912 A1 | 11/2002 |
| WO | WO-2004113082 A1 | 12/2004 |
| WO | WO-2004113450 A1 | 12/2004 |
| WO | WO-2006051733 A1 | 5/2006 |
| WO | WO-2006069205 A1 | 6/2006 |
| WO | WO-2006073696 A1 | 7/2006 |
| WO | WO-2006091957 A2 | 8/2006 |
| WO | WO-2007009871 A2 | 1/2007 |
| WO | WO-2007145378 A1 | 12/2007 |
| WO | WO-2008078841 A1 | 7/2008 |
| WO | WO-2009025809 A1 | 2/2009 |
| WO | WO-2009134273 A1 | 11/2009 |
| WO | WO-2010042784 A3 | 7/2010 |
| WO | WO-2010073916 A1 | 7/2010 |
| WO | WO-2011142404 A1 | 11/2011 |
| WO | WO-2012014825 A1 | 2/2012 |
| WO | WO-2012148421 A1 | 11/2012 |
| WO | WO-2013060377 A1 | 5/2013 |
| WO | WO-2013087249 A1 | 6/2013 |
| WO | WO-2013132339 A1 | 9/2013 |
| WO | WO-2013132340 A1 | 9/2013 |
| WO | WO-2013132343 A1 | 9/2013 |
| WO | WO-2013132345 A1 | 9/2013 |
| WO | WO-2013132356 A1 | 9/2013 |
| WO | WO-2013132418 A2 | 9/2013 |
| WO | WO-2013132419 A1 | 9/2013 |
| WO | WO-2013132420 A1 | 9/2013 |
| WO | WO-2013132424 A1 | 9/2013 |
| WO | WO-2013132432 A1 | 9/2013 |
| WO | WO-2013132438 A2 | 9/2013 |
| WO | WO-2013132439 A1 | 9/2013 |
| WO | WO-2013136220 A1 | 9/2013 |
| WO | WO-2015026864 A1 | 2/2015 |
| WO | WO-2015036864 A1 | 3/2015 |
| WO | WO-2015036906 A1 | 3/2015 |
| WO | WO-2015036960 A1 | 3/2015 |
| WO | WO-2016166690 A1 | 10/2016 |
| WO | WO-2017208155 A1 | 12/2017 |
| WO | WO-2017208246 A1 | 12/2017 |

(56) References Cited

FOREIGN PATENT DOCUMENTS

WO  WO-2018100541 A1  6/2018
WO  WO-2020136517 A1  7/2020

OTHER PUBLICATIONS

"Amino Functional Silicone Polymers", in Xiameter.COPYRGT. 2009 Dow Corning Corporation.
Basf, "JONCRYL 537", Datasheet, Retrieved from the internet: Mar. 23, 2007 p. 1.
Clariant., "Ultrafine Pigment Dispersion for Design and Creative Materials: Hostafine Pigment Preparation" Jun. 19, 2008. Retrieved from the Internet: [URL: http://www.clariant.com/C125720D002B963C/4352D0BC052E90CEC1257479002707D9/$FILE/DP6208E_0608_FL_Hostafinefordesignandcreativematerials.pdf].
CN101073937A Machine Translation (by EPO and Google)—published Nov. 21, 2007; Werner Kaman Maschinen GMBH & [DE].
CN101177057 Machine Translation (by EPO and Google)—published May 14, 2008—Hangzhou Yuanyang Industry Co.
CN101249768A Machine Translation (by EPO and Google)—published Aug. 27, 2008; Shantou Xinxie Special Paper T [CN].
CN101344746A Machine Translation (by EPO and Google)—published Jan. 14, 2009; Ricoh KK [JP].
CN101359210A Machine Translation (by EPO and Google)—published Feb. 4, 2009; Canon KK [JP].
CN101524916A Machine Translation (by EPO and Google)—published Sep. 9, 2009; Fuji Xerox CO LTD.
CN101544100A Machine Translation (by EPO and Google)—published Sep. 30, 2009; Fuji Xerox CO LTD.
CN101592896A Machine Translation (by EPO and Google)—published Dec. 2, 2009; Canon KK.
CN101820241A Machine Translation (by EPO and Google)—published Sep. 1, 2010; Canon KK.
CN101873982A Machine Translation (by EPO and Google)—published Oct. 27, 2010; Habasit AG, Delair et al.
CN102229294A Machine Translation (by EPO and Google)—published Nov. 2, 2011; Guangzhou Changcheng Ceramics CO LTD.
CN102300932A Machine Translation (by EPO and Google)—published Dec. 28, 2011; Yoshida Hiroaki et al.
CN102529257A Machine Translation (by EPO and Google)—published Jul. 4, 2012; Nippon Synthetic Chem IND.
CN102648095A Machine Translation (by EPO and Google)—published Aug. 22, 2012; Mars INC.
CN102673209A Machine Translation (by EPO and Google)—published Sep. 19, 2012; Wistron CORP.
CN102925002 Machine Translation (by EPO and Google)—published Feb. 13, 2013; Jiangnan University, Fu et al.
CN103045008A Machine Translation (by EPO and Google)—published Apr. 17, 2013; Fuji Xerox CO LTD.
CN103568483A Machine Translation (by EPO and Google)—published Feb. 12, 2014; Anhui Printing Mechanical & Electrical CO LTD.
CN103627337A Machine Translation (by EPO and Google)—published Mar. 12, 2014; Suzhou Banlid New Material CO LTD.
CN103991293B Machine Translation (by EPO and Google)—issued on Jan. 4, 2017; Miyakoshi Printing Machinery CO., LTD, Junichi et al.
CN104015415A Machine Translation (by EPO and Google)—published Sep. 3, 2014; Avery Dennison CORP.
CN104618642 Machine Translation (by EPO and Google); published on May 13, 2015, Yulong Comp Comm Tech Shenzhen.
CN105058999A Machine Translation (by EPO and Google)—published Nov. 18, 2015; Zhuoli Imaging Technology CO LTD.
CN107111267A Machine Translation (by EPO and Google)—published Aug. 29, 2017; Hewlett Packard Indigo BV.
CN1121033A Machine Translation (by EPO and Google)—published Apr. 24, 1996; Kuehnle Manfred R [US].
CN1212229A Machine Translation (by EPO and Google)—published Mar. 31, 1999; Honta Industry CORP [JP].
CN1305895A Machine Translation (by EPO and Google)—published Aug. 1, 2001; Imaje Sa [FR].
CN1493514A Machine Translation (by EPO and Google)—published May 5, 2004; GD Spa, Boderi et al.
CN1543404A Machine Translation (by EPO and Google)—published Nov. 3, 2004; 3M Innovative Properties CO [US].
CN1555422A Machine Translation (by EPO and Google)—published Dec. 15, 2004; Noranda INC.
CN1680506A Machine Translation (by EPO and Google)—published Oct. 12, 2005; Shinetsu Chemical CO [JP].
CN1703326A Machine Translation (by EPO and Google)—published Nov. 30, 2005; Nissha Printing [JP].
CN1809460A Machine Translation (by EPO and Google)—published Jul. 26, 2006; Canon KK.
CN201410787Y Machine Translation (by EPO and Google)—published Feb. 24, 2010; Zhejiang Chanx Wood CO LTD.
Co-pending U.S. Appl. No. 16/590,397, filed Oct. 2, 2019.
Co-pending U.S. Appl. No. 17/155,121, filed Jan. 22, 2021.
DE102010049945A1 Machine Translation (by EPO and Google)—published May 26, 2011; Heidelberger Druckmasch AG [DE].
DE102010060999 Machine Translation (by EPO and Google)—published Jun. 6, 2012; Wolf, Roland, Dr.-Ing.
Epomin Polymert, product information from Nippon Shokubai, dated Feb. 28, 2014.
Flexicon., "Bulk Handling Equipment and Systems: Carbon Black," 2018, 2 pages.
Furia, T.E., "CRC Handbook of Food Additives, Second Edition, vol. 1" CRC Press LLC, 1972, p. 434.
Handbook of Print Media, 2000, Springer Verlag, Berlin/Heidelberg/New York, pp. 127-136,748—With English Translation.
IP.com Search, 2018, 2 pages.
IP.com Search, 2019, 1 page.
IP.com search (Year: 2021).
JP2000108320 Machine Translation (by PlatPat English machine translation)—published Apr. 18, 2000 Brother Ind. Ltd.
JP2000108334A Machine Translation (by EPO and Google)—published Apr. 18, 2000; Brother IND LTD.
JP2000137595A Machine Translation (by EPO and Google)—published May 16, 2000; Dainippon Screen MFG.
JP2000141710A Machine Translation (by EPO and Google)—published May 23, 2000; Brother IND LTD.
JP2000168062A Machine Translation (by EPO and Google)—published Jun. 20, 2000; Brother IND LTD.
JP2000169772 Machine Translation (by EPO and Google)—published Jun. 20, 2000; Tokyo Ink MFG Co Ltd.
JP2000206801 Machine Translation (by PlatPat English machine translation); published on Jul. 28, 2000, Canon KK, Kobayashi et al.
JP2000343025A Machine Translation (by EPO and Google)—published Dec. 12, 2000; Kyocera CORP.
JP2001005245A Machine Translation (by EPO and Google)—published Jan. 12, 2001; Matsushita Electric IND CO LTD.
JP2001088430A Machine Translation (by EPO and Google)—published Apr. 3, 2001; Kimoto KK.
JP2001098201A Machine Translation (by EPO and Google)—published Apr. 10, 2001; Eastman Kodak CO.
JP2001139865A Machine Translation (by EPO and Google)—published May 22, 2001; Sharp KK.
JP2001164165A Machine Translation (by EPO and Google)—published Jun. 19, 2001; Dainippon Ink & Chemicals.
JP2001199150A Machine Translation (by EPO and Google)—published Jul. 24, 2001; Canon KK.
JP2001206522 Machine Translation (by EPO, PlatPat and Google)—published Jul. 31, 2001; Nitto Denko Corp, Kato et al.
JP2002049211A Machine Translation (by EPO and Google)—published Feb. 15, 2002; PFU LTD.
JP2002069346A Machine Translation (by EPO and Google)—published Mar. 8, 2002; Dainippon Ink & Chemicals.
JP2002103598A Machine Translation (by EPO and Google)—published Apr. 9, 2002; Olympus Optical CO.
JP2002169383 Machine Translation (by EPO, PlatPat and Google)—published Jun. 14, 2002 Ricoh KK.

(56) References Cited

OTHER PUBLICATIONS

JP2002234243 Machine Translation (by EPO and Google)—published Aug. 20, 2002; Hitachi Koki CO LTD.
JP2002278365 Machine Translation (by PlatPat English machine translation)—published Sep. 27, 2002 Katsuaki, Ricoh KK.
JP2002292983A Machine Translation (by EPO and Google)—published Oct. 9, 2002; Fuji Xerox CO LTD.
JP2002304066A Machine Translation (by EPO and Google)—published Oct. 18, 2002; PFU LTD.
JP2002326733 Machine Translation (by EPO, PlatPat and Google)—published Nov. 12, 2002; Kyocera Mita Corp.
JP2002371208 Machine Translation (by EPO and Google)—published Dec. 26, 2002; Canon Inc.
JP2003076159A Machine Translation (by EPO and Google)—published Mar. 14, 2003, Ricoh KK.
JP2003094795A Machine Translation (by EPO and Google)—published Apr. 3, 2003; Ricoh KK.
JP2003114558 Machine Translation (by EPO, PlatPat and Google)—published Apr. 18, 2003 Mitsubishi Chem Corp, Yuka Denshi CO LTD, et al.
JP2003145914A Machine Translation (by EPO and Google)—published May 21, 2003; Konishiroku Photo IND.
JP2003211770 Machine Translation (by EPO and Google)—published Jul. 29, 2003 Hitachi Printing Solutions.
JP2003219271 Machine Translation (by EPO and Google); published on Jul. 31, 2003, Japan Broadcasting.
JP2003246135 Machine Translation (by PlatPat English machine translation)—published Sep. 2, 2003 Ricoh KK, Morohoshi et al.
JP2003246484 Machine Translation (English machine translation)—published Sep. 2, 2003 Kyocera Corp.
JP2003292855A Machine Translation (by EPO and Google)—published Oct. 15, 2003; Konishiroku Photo IND.
JP2003295560A Machine Translation (by EPO and Google)—published Oct. 15, 2003; Fuji Xerox CO LTD.
JP2003313466A Machine Translation (by EPO and Google)—published Nov. 6, 2003; Ricoh KK.
JP2004009632A Machine Translation (by EPO and Google)—published Jan. 15, 2004; Konica Minolta Holdings INC.
JP2004011263A Machine Translation (by EPO and Google)—published Jan. 15, 2004; Sumitomo Denko Steel Wire KK.
JP2004019022 Machine Translation (by EPO and Google)—published Jan. 22, 2004; Yamano et al.
JP2004025708A Machine Translation (by EPO and Google)—published Jan. 29, 2004; Konica Minolta Holdings INC.
JP2004034441A Machine Translation (by EPO and Google)—published Feb. 5, 2004; Konica Minolta Holdings INC.
JP2004077669 Machine Translation (by PlatPat English machine translation)—published Mar. 11, 2004 Fuji Xerox Co Ltd.
JP2004114377(A) Machine Translation (by EPO and Google)—published Apr. 15, 2004; Konica Minolta Holdings Inc, et al.
JP2004114675 Machine Translation (by EPO and Google)—published Apr. 15, 2004; Canon Inc.
JP2004148687A Machine Translation (by EPO and Google)—published May 27, 2014; Mitsubishi Heavy IND LTD.
JP2004167902A Machine Translation (by EPO and Google)—published Jun. 17, 2004; Nippon New Chrome KK.
JP2004231711 Machine Translation (by EPO and Google)—published Aug. 19, 2004; Seiko Epson Corp.
JP2004261975 Machine Translation (by EPO, PlatPat and Google); published on Sep. 24, 2004, Seiko Epson CORP, Kataoka et al.
JP2004325782A Machine Translation (by EPO and Google)—published Nov. 18, 2004; Canon KK.
JP2004340983A Machine Translation (by EPO and Google)—published Dec. 2, 2004; Ricoh KK.
JP2004524190A Machine Translation (by EPO and Google)—published Aug. 12, 2004; Avery Dennison CORP.
JP2005014255 Machine Translation (by EPO and Google)—published Jan. 20, 2005; Canon Inc.
JP2005014256 Machine Translation (by EPO and Google)—published Jan. 20, 2005; Canon Inc.
JP2005114769 Machine Translation (by PlatPat English machine translation)—published Apr. 28, 2005 Ricoh KK.
JP2005215247A Machine Translation (by EPO and Google)—published Aug. 11, 2005; Toshiba CORP.
JP2005319593 Machine Translation (by EPO and Google)—published Nov. 17, 2005, Jujo Paper CO LTD.
JP2006001688 Machine Translation (by PlatPat English machine translation)—published Jan. 5, 2006 Ricoh KK.
JP2006023403A Machine Translation (by EPO and Google)—published Jan. 26, 2006; Ricoh KK.
JP2006095870A Machine Translation (by EPO and Google)—published Apr. 13, 2006; Fuji Photo Film CO LTD.
JP2006102975 Machine Translation (by EPO and Google)—published Apr. 20, 2006; Fuji Photo Film CO LTD.
JP2006137127 Machine Translation (by EPO and Google)—published Jun. 1, 2006; Konica Minolta Med & Graphic.
JP2006143778 Machine Translation (by EPO, PlatPat and Google)—published Jun. 8, 2006 Sun Bijutsu Insatsu KK et al.
JP2006152133 Machine Translation (by EPO, PlatPat and Google)—published Jun. 15, 2006 Seiko Epson Corp.
JP2006224583A Machine Translation (by EPO and Google)—published Aug. 31, 2006; Konica Minolta Holdings INC.
JP2006231666A Machine Translation (by EPO and Google)—published Sep. 7, 2006; Seiko Epson CORP.
JP2006234212A Machine Translation (by EPO and Google)—published Sep. 7, 2006; Matsushita Electric IND CO LTD.
JP2006243212 Machine Translation (by PlatPat English machine translation)—published Sep. 14, 2006 Fuji Xerox Co Ltd.
JP2006263984 Machine Translation (by EPO, PlatPat and Google)—published Oct. 5, 2006 Fuji Photo Film Co Ltd.
JP2006347081 Machine Translation (by EPO and Google)—published Dec. 28, 2006; Fuji Xerox Co Ltd.
JP2006347085 Machine Translation (by EPO and Google)—published Dec. 28, 2006 Fuji Xerox Co Ltd.
JP2007025246A Machine Translation (by EPO and Google)—published Feb. 1, 2007; Seiko Epson CORP.
JP2007041530A Machine Translation (by EPO and Google)—published Feb. 15, 2007; Fuji Xerox CO LTD.
JP2007069584 Machine Translation (by EPO and Google)—published Mar. 22, 2007 Fujifilm.
JP2007079159A Machine Translation (by EPO and Google)—published Mar. 29, 2007; Ricoh KK.
JP2007174060A Machine Translation (by EPO and Google)—published Jul. 5, 2007; Fuji Xerox CO LTD.
JP2007216673 Machine Translation (by EPO and Google)—published Aug. 30, 2007 Brother Ind.
JP2007253347A Machine Translation (by EPO and Google)—published Oct. 4, 2007; Ricoh KK, Matsuo et al.
JP2008006816A Machine Translation (by EPO and Google)—published Jan. 17, 2008; Fujifilm CORP.
JP2008018716 Machine Translation (by EPO and Google)—published Jan. 31, 2008; Canon Inc.
JP2008082820A Machine Translation (by EPO and Google)—published Apr. 10, 2008; Ricoh KK.
JP2008137146A Machine Translation (by EPO and Google)—published Jun. 19, 2008; CBG Acciai SRL.
JP2008137239A Machine Translation (by EPO and Google); published on Jun. 19, 2008, Kyocera Mita CORP.
JP2008139877A Machine Translation (by EPO and Google)—published Jun. 19, 2008; Xerox CORP.
JP2008142962 Machine Translation (by EPO and Google)—published Jun. 26, 2008; Fuji Xerox Co Ltd.
JP2008183744A Machine Translation (by EPO and Google)—published Aug. 14, 2008; Fuji Xerox CO LTD.
JP2008194997A Machine Translation (by EPO and Google)—published Aug. 28, 2008; Fuji Xerox CO LTD.
JP2008201564 Machine Translation (English machine translation)—published Sep. 4, 2008 Fuji Xerox Co Ltd.
JP2008238674A Machine Translation (by EPO and Google)—published Oct. 9, 2008; Brother IND LTD.
JP2008246990 Machine Translation (by EPO and Google)—published Oct. 16, 2008, Jujo Paper CO LTD.

(56) References Cited

OTHER PUBLICATIONS

JP2008254203A Machine Translation (by EPO and Google)—published Oct. 23, 2008; Fujifilm CORP.
JP2008255135 Machine Translation (by EPO and Google)—published Oct. 23, 2008; Fujifilm Corp.
JP2009045794 Machine Translation (by EPO and Google)—published Mar. 5, 2009; Fujifilm CORP.
JP2009045851A Machine Translation (by EPO and Google); published on Mar. 5, 2009, Fujifilm CORP.
JP2009045885A Machine Translation (by EPO and Google)—published Mar. 5, 2009; Fuji Xerox CO LTD.
JP2009083314 Machine Translation (by EPO, PlatPat and Google)—published Apr. 23, 2009 Fujifilm Corp.
JP2009083317 Abstract; Machine Translation (by EPO and Google)—published Apr. 23, 2009; Fuji Film CORP.
JP2009083325 Abstract; Machine Translation (by EPO and Google)—published Apr. 23, 2009 Fujifilm.
JP2009096175 Machine Translation (EPO, PlatPat and Google) published on May 7, 2009 Fujifilm CORP.
JP2009148908A Machine Translation (by EPO and Google)—published Jul. 9, 2009; Fuji Xerox CO LTD.
JP2009154330 Machine Translation (by EPO and Google)—published Jul. 16, 2009; Seiko Epson Corp.
JP2009190375 Machine Translation (by EPO and Google)—published Aug. 27, 2009; Fuji Xerox Co Ltd.
JP2009202355 Machine Translation (by EPO and Google)—published Sep. 10, 2009; Fuji Xerox Co Ltd.
JP2009214318 Machine Translation (by EPO and Google)—published Sep. 24, 2009 Fuji Xerox CO LTD.
JP2009214439 Machine Translation (by PlatPat English machine translation)—published Sep. 24, 2009 Fujifilm Corp.
JP2009226805A Machine Translation (by EPO and Google)—published Oct. 8, 2009; Fuji Xerox CO LTD.
JP2009226852 Machine Translation (by EPO and Google)—published Oct. 8, 2009; Hirato Katsuyuki, Fujifilm CORP.
JP2009226890A Machine Translation (by EPO and Google)—published Oct. 8, 2009; Fuji Xerox CO LTD.
JP2009227909A Machine Translation (EPO, PlatPat and Google) published on Oct. 8, 2009 Fujifilm CORP.
JP2009233977 Machine Translation (by EPO and Google)—published Oct. 15, 2009; Fuji Xerox Co Ltd.
JP2009234219 Machine Translation (by EPO and Google)—published Oct. 15, 2009; Fujifilm CORP.
JP2009240925A Machine Translation (by EPO and Google)—published Oct. 22, 2009; Fujifilm CORP.
JP2009271422A Machine Translation (by EPO and Google)—published Nov. 19, 2009; Ricoh KK.
JP2009532240A Machine Translation (by EPO and Google)—published Sep. 10, 2009; Aisapack Holding SA.
JP2010030300A Machine Translation (by EPO and Google)—published Feb. 12, 2010; Xerox CORP.
JP2010054855 Machine Translation (by PlatPat English machine translation)—published Mar. 11, 2010 Itatsu, Fuji Xerox Co.
JP2010105365 Machine Translation (by EPO and Google)—published May 13, 2010; Fuji Xerox Co Ltd.
JP2010173201 Abstract; Machine Translation (by EPO and Google)—published Aug. 12, 2010; Richo Co Ltd.
JP2010184376 Machine Translation (by EPO, PlatPat and Google)—published Aug. 26, 2010 Fujifilm Corp.
JP2010214885A Machine Translation (by EPO and Google)—published Sep. 30, 2010; Mitsubishi Heavy IND LTD.
JP2010228192 Machine Translation (by PlatPat English machine translation)—published Oct. 14, 2010 Fuji Xerox.
JP2010228392A Machine Translation (by EPO and Google)—published Oct. 14, 2010; Jujo Paper CO LTD.
JP2010231040A Machine Translation (by EPO and Google)—published Oct. 14, 2010; Brother IND LTD.
JP2010234599A Machine Translation (by EPO and Google)—published Oct. 21, 2010; Duplo Seiko CORP et al.
JP2010234681A Machine Translation (by EPO and Google)—published Oct. 21, 2010; Riso Kagaku CORP.
JP2010240897A Machine Translation (by EPO and Google)—published Oct. 28, 2010; Toppan Printing CO LTD.
JP2010241073 Machine Translation (by EPO and Google)—published Oct. 28, 2010; Canon Inc.
JP2010247381A Machine Translation (by EPO and Google); published on Nov. 4, 2010, Ricoh CO LTD.
JP2010258193 Machine Translation (by EPO and Google)—published Nov. 11, 2010; Seiko Epson Corp.
JP2010260204A Machine Translation (by EPO and Google)—published Nov. 18, 2010; Canon KK.
JP2010260287 Machine Translation (by EPO and Google)—published Nov. 18, 2010, Canon KK.
JP2010260302A Machine Translation (by EPO and Google)—published Nov. 18, 2010; Riso Kagaku CORP.
JP2011002532 Machine Translation (by PlatPat English machine translation)—published Jan. 6, 2011 Seiko Epson Corp.
JP2011025431 Machine Translation (by EPO and Google)—published Feb. 10, 2011; Fuji Xerox Co Ltd.
JP2011031619A Machine Translation (by EPO and Google)—published Feb. 17, 2011; Xerox CORP.
JP2011037070A Machine Translation (by EPO and Google)—published Feb. 24, 2011; Riso Kagaku CORP.
JP2011064850A Machine Translation (by EPO and Google)—published Mar. 31, 2011; Seiko Epson CORP.
JP2011067956A Machine Translation (by EPO and Google)—published Apr. 7, 2011; Fuji Xerox CO LTD.
JP2011126031A Machine Translation (by EPO and Google); published on Jun. 30, 2011, Kao CORP.
JP2011144271 Machine Translation (by EPO and Google)—published Jun. 28, 2011 Toyo Ink SC Holdings CO LTD.
JP2011168024A Machine Translation (EPO, PlatPat and Google) published on Sep. 1, 2011 Ricoh CO LTD.
JP2011173325 Abstract; Machine Translation (by EPO and Google)—published Sep. 8, 2011; Canon Inc.
JP2011173326 Machine Translation (by EPO and Google)—published Sep. 8, 2011; Canon Inc.
JP2011186346 Machine Translation (by PlatPat English machine translation)—published Sep. 22, 2011 Seiko Epson Corp, Nishimura et al.
JP2011189627 Machine Translation (by Google Patents)—published Sep. 29, 2011; Canon KK.
JP2011201951A Machine Translation (by PlatPat English machine translation); published on Oct. 13, 2011, Shin-Etsu Chemical CO LTD, Todoroki et al.
JP2011224032 Machine Translation (by EPO & Google)—published Nov. 10, 2011, Mameita KK.
JP2012086437A Machine Translation (by EPO and Google)—published May 10, 2012; Sharp KK.
JP2012086499 Machine Translation (by EPO and Google)—published May 10, 2012; Canon Inc.
JP2012111194 Machine Translation (by EPO and Google)—published Jun. 14, 2012; Konica Minolta.
JP2012196787A Machine Translation (by EPO and Google)—published Oct. 18, 2012; Seiko Epson CORP.
JP2012201419A Machine Translation (by EPO and Google)—published Oct. 22, 2012; Seiko Epson CORP.
JP2013001081 Machine Translation (by EPO and Google)—published Jan. 7, 2013; KAO CORP.
JP2013060299 Machine Translation (by EPO and Google)—published Apr. 4, 2013; Ricoh CO LTD.
JP2013103474 Machine Translation (by EPO and Google)—published May 30, 2013; Ricoh CO LTD.
JP2013104044A Machine Translation (by EPO and Google)—published May 30, 2013; Three M Innovative Properties.
JP2013121671 Machine Translation (by EPO and Google)—published Jun. 20, 2013; Fuji Xerox CO LTD.
JP2013129158 Machine Translation (by EPO and Google)—published Jul. 4, 2013; Fuji Xerox CO LTD.
JP2014008609A Machine Translation (EPO, PlatPat and Google) published on Jan. 20, 2014 Seiko Epson CORP.

(56) References Cited

OTHER PUBLICATIONS

JP2014047005A Machine Translation (by EPO and Google) - published Mar. 17, 2014; Ricoh CO LTD.
JP2014073675A Machine Translation (EPO and Google) published on Apr. 24, 2014 Ricoh CO LTD.
JP2014094827A Machine Translation (by EPO and Google)—published May 22, 2014; Panasonic CORP.
JP2014131843A Machine Translation (by EPO and Google)—published Jul. 17, 2014; Ricoh CO LTD.
JP2015202616A Machine Translation (EPO, PlatPat and Google) published on Nov. 16, 2015 Canon KK.
JP2016074206A Machine Translation (EPO and Google) published on May 12, 2016 Xerox CORP.
JP2016093999A Machine Translation (by EPO and Google)—published May 26, 2016; Canon KK.
JP2016185688A Machine Translation (by EPO and Google)—published Oct. 27, 2016; Hitachi Industry Equipment Systems CO LTD.
JP2017093178A Machine Translation (EPO and Google) published on May 25, 2017 Samsung Electronics CO LTD.
JP2017219753A Machine Translation (by EPO and Google)—published Dec. 14, 2017; Ricoh CO LTD.
JP2529651 B2 Machine Translation (by EPO and Google)—issued Aug. 28, 1996;OSAKA Sealing Insatsu KK.
JP4562388B2 Machine Translation (by EPO and Google)—published Oct. 13, 2010; SK Kaken CO LTD.
JP4743502B2 Machine Translation (by EPO and Google)—published Aug. 10, 2011; Fujifilm CORP.
JP4804394I Machine Translation (by EPO and Google)—published Dec. 21, 1973.
JPH03248170A Machine Translation (by EPO & Google)—published Nov. 6, 1991; Fujitsu LTD.
JPH05147208 Machine Translation (by EPO and Google)—published Jun. 15, 1993-Mita Industrial Co Ltd.
JPH06100807 Machine Translation (by EPO and Google)—published Apr. 12, 1994; Seiko Instr INC.
JPH06171076A Machine Translation (by PlatPat English machine translation)—published Jun. 21, 1994, Seiko Epson CORP.
JPH06345284A Machine Translation (by EPO and Google); published on Dec. 20, 1994, Seiko Epson CORP.
JPH06954A Machine Translation (by EPO and Google)—published Jan. 11, 1994; Seiko Epson CORP.
JPH07186453A Machine Translation (by EPO and Google)—published Jul. 25, 1995; Toshiba CORP.
JPH07238243A Machine Translation (by EPO and Google)—published Sep. 12, 1995; Seiko Instr INC.
JPH08112970 Machine Translation (by EPO and Google)—published May 7, 1996; Fuji Photo Film Co Ltd.
JPH0862999A Machine Translation (by EPO & Google)—published Mar. 8, 1996 Toray Industries, Yoshida, Tomoyuki.
JPH09123432 Machine Translation (by EPO and Google)—published May 13, 1997, Mita Industrial CO LTD.
JPH09157559A Machine Translation (by EPO and Google)—published Jun. 17, 1997; Toyo Ink MFG CO.
JPH09172551A Machine Translation (by EPO and Google)—published Jun. 30, 1997; Fuji Photo Film CO LTD.
JPH09281851A Machine Translation (by EPO and Google)—published Oct. 31, 1997; Seiko Epson CORP.
JPH09300678A Machine Translation (by EPO and Google)—published Nov. 25, 1997; Mitsubishi Electric CORP.
JPH09314867A Machine Translation (by PlatPat English machine translation)—published Dec. 9, 1997, Toshiba CORP.
JPH10130597A Machine Translation (by EPO and Google)—published May 19, 1998; Sekisui Chemical CO LTD.
JPH10207645A Machine Translation (by EPO and Google)—published Aug. 7, 1998; Canon KK.
JPH11106081A Machine Translation (by EPO and Google)—published Apr. 20, 1999; Ricoh KK.
JPH11138740A Machine Translation (by EPO and Google)—published May 25, 1999; Nikka KK.
JPH11245383A Machine Translation (by EPO and Google)—published Sep. 14, 1999; Xerox CORP.
JPH5297737 Machine Translation (by EPO & Google machine translation)—published Nov. 12, 1993 Fuji Xerox Co Ltd.
JPS5578904A Machine Translation (by EPO and Google)—published Jun. 14, 1980; Yokoyama Haruo.
JPS57121446U Machine Translation (by EPO and Google)—published Jul. 28, 1982.
JPS60199692A Machine Translation (by EPO and Google)—published Oct. 9, 1985; Suwa Seikosha KK.
JPS6076343A Machine Translation (by EPO and Google)—published Apr. 30, 1985; Toray Industries.
JPS6223783A Machine Translation (by EPO and Google)—published Jan. 31, 1987; Canon KK.
Larostat 264 A Quaternary Ammonium Compound, Technical Bulletin, BASF Corporation, Dec. 2002, p. 1.
Machine Translation (by EPO and Google) of JPH07112841 published on May 2, 1995 Canon KK.
Marconi Studios, Virtual Set Real Time; http://www.marconistudios.il/pages/virtualset_en.php.
Mestha L.K. et al., "Control Elements in Production Printing and Publishing Systems: Docucolor Igen3," 42nd IEEE International Conference on Decision and Control (IEEE Cat. No. 03CH37475), Dec. 2003, vol. 4, pp. 4096-4108. doi: 10.11 09/CDC.2003.1271793.
Montuori G.M., et al., "Geometrical Patterns for Diagrid Buildings: Exploring Alternative Design Strategies From the Structural Point of View," Engineering Structures, Jul. 2014, vol. 71, pp. 112-127.
"Solubility of Alcohol", in http://www.solubilityoflhings.com/water/alcohol; downloaded on Nov. 30, 2017.
Poly(vinyl acetate) data sheet. PolymerProcessing.com. Copyright 2010. http://polymerprocessing .com/polymers/PV AC.html.
Royal Television Society, The Flight of the Phoenix; https://rts.org.uk/article/flight-phoenix, Jan. 27, 2011.
RU2180675C2 Machine Translation (by EPO and Google)—published Mar. 20, 2002; Zao Rezinotekhnika.
RU2282643C1 Machine Translation (by EPO and Google)—published Aug. 27, 2006; Balakovorezinotekhnika Aoot.
Technical Information Lupasol Types, Sep. 2010, 10 pages.
The Engineering Toolbox., "Dynamic Viscosity of Common Liquids," 2018, 4 pages.
Units of Viscosity published by Hydramotion Ltd. 1 York Road Park, Malton, York Y017 6YA, England; downloaded from www.hydramotion.com website on Jun. 19, 2017.
WO2006051733A1 Machine Translation (by EPO and Google)—published May 18, 2006; Konica Minolta Med & Graphic.
WO2010073916A1 Machine Translation (by EPO and Google)—published Jul. 1, 2010; Nihon Parkerizing [JP] et al.
WO2013087249 Machine Translation (by EPO and Google)—published Jun. 20, 2013; Koenig & Bauer AG.
Xiameter "OFS-0777 Siliconate Technical Data Sheet," Dec. 31, 2017, 5 pages. [retrieved on Oct. 13, 2021]: Retrieved from the internet: [URL:https://www.dow.com/en-us/document-viewer.html?ramdomVar=6236427586842315077&docPath=/content/dam/dcc/documents/en-us/productdatasheet/95/95-4/95-435-01-xiameter-ofs-0777-siliconate.pdf].

* cited by examiner

MITIGATING DISTORTIONS IN PRINTED IMAGES

FIELD OF THE INVENTION

The present invention relates generally to digital printing systems, and particularly to methods and systems for mitigating distortions in digitally printed images.

BACKGROUND OF THE INVENTION

Flexible substrates are sometimes used in reading media from and/or in applying media to the flexible substrate, such as in digital printing. Various techniques have been published for controlling tension applied to the flexible substrate during the reading and/or applying of the media.

For example, U.S. Patent Application Publication 2009/0196670 describes a tape drive for use in for example a transfer printing apparatus to drive a printer ribbon. The printer ribbon is mounted on two spools each of which is driven by a respective stepper motor. A controller controls the energization of the motor such that the ribbon is transported in at least one direction between spools mounted on the spool support. The controller is operative to energize both motors to drive the spools of ribbon in the direction of ribbon transport to achieve push-pull operations. Ribbon tension is monitored to enable accurate control of ribbon supply and ribbon take-up, the ribbon tension being monitored, for example, by monitoring power supply to the two stepper motors.

U.S. Patent Application Publication 2013/0033554 describes a print station system having a chassis for housing a modular print station; a power source in communication with the print station; a controller circuit card assembly in communication with the print station; a display panel in communication with the print station; a media rewind hub; a pair of adjustable media guides connected about a base of the print station; and at least one sensor affixed to the print station base and being operable for detecting the presence and position of media passing through a media feed path of the print station system.

SUMMARY OF THE INVENTION

An embodiment of the present invention that is described herein provides a method including receiving a first signal indicative of a first electrical current measured on a first motion assembly for moving a flexible substrate that receives droplets of a printing fluid from an image forming station to form an image thereon. A second signal indicative of a second electrical current measured on a second motion assembly for moving the flexible substrate, is received, wherein a section of the flexible substrate is moving between the first and second motion assemblies. A parameter, which is indicative of a distortion in the image, is calculated based on the first and second signals. In response to detecting, based on the parameter, an increase in the distortion, a corrective action is applied to reduce the distortion.

In some embodiments, the image has first and second axes, and the distortion includes a displacement of a pattern, in at least a section of the image, along the first axis that changes with a position along the second axis, and applying the corrective action includes reducing an increase in the displacement along the first axis. In other embodiments, the first axis is orthogonal to the second axis, and the first axis is parallel to a movement axis of the flexible substrate. In yet other embodiments, the first axis is orthogonal to the second axis, and the first axis is orthogonal to a movement axis of the flexible substrate.

In an embodiment, the image includes a first color having a first pattern and a second color having a second pattern, the distortion includes a variation in the displacement between the first pattern and the second pattern, and applying the corrective action includes reducing an increase in the variation of the displacement. In another embodiment, the distortion includes a variation in a color-to-color position difference between first and second colors of the image, and applying the corrective action includes reducing an increase in the variation of the color-to-color position difference in the image. In yet another embodiment, the distortion includes a difference between an intended position of the image on the flexible substrate and a measured position of the image on the flexible substrate, and applying the corrective action includes reducing the difference between the intended position and the measured position.

In some embodiments, at least one of the first and second motion assemblies includes a roller for moving the flexible substrate, and an electrical motor for rotating the roller, and the first electrical current is measured on the electrical motor. In other embodiments, calculating the parameter includes calculating a difference between the first and second electrical currents, such that, the calculated difference is indicative of a tension applied to the section of the flexible substrate. In yet other embodiments, applying the corrective action includes maintaining the tension applied to the section by adjusting a speed in at least one of the first and second motion assemblies.

In an embodiment, the flexible substrate includes an intermediate transfer member (ITM) for transferring the image to a target substrate in an impression station, and the method includes receiving a third signal indicative of a velocity of the ITM at the impression station, and applying the corrective action includes, in response to detecting, based on the third signal, that the velocity has changed beyond a predefined velocity range, adjusting a speed in at least one of the first and second motion assemblies. In another embodiment, the impression station includes an impression cylinder, and the third signal is indicative of a velocity of the impression cylinder.

In some embodiments, the method includes: (a) receiving: (i) a first input signal indicative of one or more first variables of the first motion assembly, and (ii) a second input signal indicative of one or more second variables of the second motion assembly, and (b) defining a virtual axis for determining, based on: (i) the third signal, and (ii) the first and second input signals, a first speed of the ITM in the first motion assembly and a second speed of the ITM in the second motion assembly.

In other embodiments, the first motion assembly includes: a first roller, a first motor and a first gear for rotating the first roller. The second motion assembly includes: a second roller, a second motor and a second gear for rotating the second roller, and applying the corrective action includes adjusting at least one of the first and second gears in response to detecting that at least one of the first and second variables exceeds a predefined threshold. In yet other embodiments, at least one of the first and second variable is selected from a list consisting of: (i) a diameter of the roller, (ii) a temperature of the roller, and (iii) a nominal speed of the roller.

There is additionally provided, in accordance with an embodiment of the present invention, a system including an interface and a processor. The interface is configured to: (i)

receive a first signal indicative of a first electrical current measured on a first motion assembly for moving a flexible substrate that receives droplets of a printing fluid from an image forming station to form an image thereon, and (ii) receive a second signal indicative of a second electrical current measured on a second motion assembly for moving the flexible substrate, wherein a section of the flexible substrate is moving between the first and second motion assemblies. The processor is configured to: (i) calculate, based on the first and second signals, a parameter, which is indicative of a distortion in the image, and (ii) in response to detecting, based on the parameter, an increase in the distortion, the processor is configured to apply a corrective action to reduce the distortion.

The present invention will be more fully understood from the following detailed description of the embodiments thereof, taken together with the drawings in which:

DETAILED DESCRIPTION OF EMBODIMENTS

Overview

Figure 1:
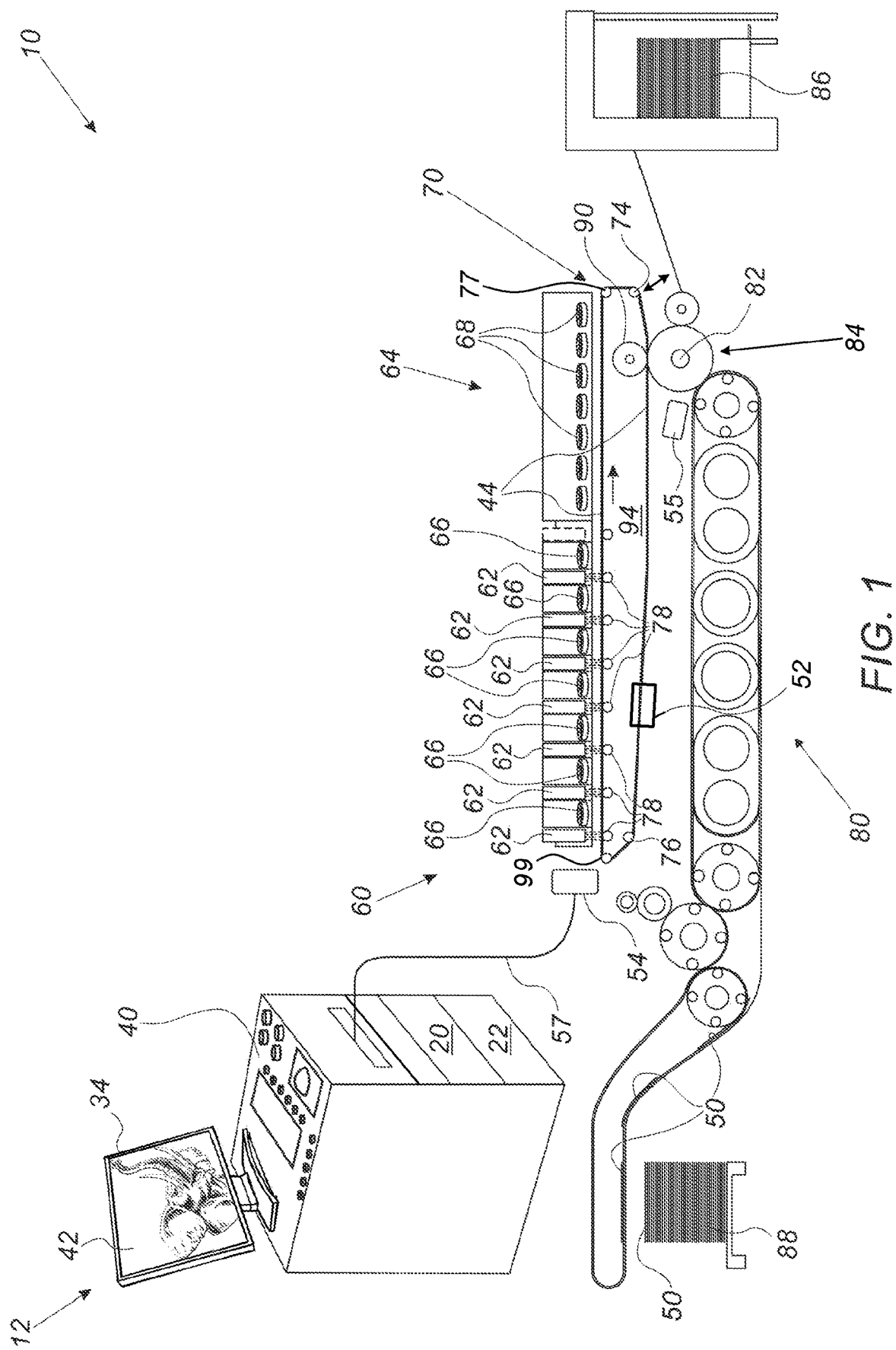
FIG. 1 is a schematic side view of a digital printing system, in accordance with an embodiment of the present invention.

Printing on a flexible substrate provides many benefits but under some circumstances an image printed on a flexible substrate may contain distortions related to, among other things, the flexibility of the substrate.

Embodiments of the present invention that are described hereinbelow provide methods and system for mitigating distortions in printed images. In some embodiments, a system for digital printing comprises a flexible intermediate transfer member (ITM) configured to receive droplets of printing fluids to form an image thereon, and to move along an axis, referred to herein as an X axis, to an impression station, so as to transfer the image to a target substrate, such as a paper sheet.

The printed image may have geometric distortions along the X axis that change with the position on a Y axis (orthogonal to the X axis), referred to herein as wave X(Y), and/or distortions along the Y axis that change with the position on the X axis, referred to herein as wave Y(X).

At least one of the wave X(Y) and wave Y(X) distortions may be caused by multiple sources, such as but not limited to, bending and stretching of the ITM, and deviation from the specified velocity (i) when receiving droplets of printing fluid from an image forming station, and (ii) when transferring the image at the impression station.

In some embodiments, the system comprises first and second motion assemblies, which are configured to move the ITM for receiving and transferring the image as described above. Each motion assembly comprises a roller and an electric motor, which is configured to rotate the roller about its rotation axis.

In some embodiments, the system comprises a processing unit, also referred to herein as a controller, which is configured to control the speed of the rollers (by controlling various components of the motion assembly, such as the motor and gear), so as to move the ITM at a specified speed. Note that each motion assembly is configured to move the ITM at a different speed, so as to maintain the moving ITM taut.

In some embodiments, when moving the ITM an interface of the controller is configured to receive: (i) a first signal indicative of a first electrical current measured on the motor of the first motion assembly, and (ii) a second signal indicative of a second electrical current measured on the motor of the second motion assembly.

In some embodiments, based on the first and second signals, the controller is configured to calculate a parameter, which is indicative of a distortion in the image. The parameter may comprise a difference or ratio between the first and second electrical currents, or any other suitable parameter.

In some embodiments, in response to detecting, based on the parameter, an increase in the distortion, the controller is configured to apply a corrective action to reduce the distortion. For example, when the difference between the first and second electrical currents exceeds a predefined upper or lower predefined threshold, the controller is configured to control at least one of the motion assemblies to adjust the speed of the respective roller(s), so as to: (i) reduce the aforementioned distortion, and/or (ii) prevent formation of a new distortion.

In some embodiments, the controller is configured to receive a third signal indicative of the velocity of the ITM at the impression station. The velocity may be measured using a motion encoder integrated with the impression station, and the measured velocity may be filtered for smoothing the third signal. Based on the velocity of the third signal, the controller is configured to determine a gear ratio between the gears of the first and second motion assemblies. Moreover, in response to detecting a variation in the ITM velocity at the impression station, the controller is configured to adjust the speed of the roller in at least one of the first and second motion assemblies.

In other embodiments, in addition to the signals described above, the controller is configured to receive one or more signals indicative of the velocity of the ITM using any sort of one or more encoders disposed at any suitable position(s) along the path of the ITM. Moreover, the ITM may have an encoder, which is integrated thereon or therein or therewith, and one or more suitable sensor(s) disposed along the path of the ITM, and configured to produce respective signal(s) indicative of the position of sections of the ITM. Based on the respective signals, the controller is configured to estimate the speed of the ITM along the path.

The disclosed techniques mitigate various types of distortions in images printed on a flexible substrate. Moreover, the disclosed techniques improve productivity of the printing system by automatically calibrating the ITM speed (without stopping the system operation) during the printing process. Such calibration may be needed, for example, when the diameter of one or more: (i) roller(s) of the motion assemblies and/or (ii) cylinder(s) of the impression station, is changing in response to altering temperature thereof.

The embodiments and principles described above are applicable to: (i) printing systems using an intermediate transfer member for transferring images to a target substrate (as described above), and (ii) printing systems for printing directly on a flexible target substrate.

Furthermore, the disclosed techniques may be used, mutatis mutandis, for improving quality and reliability of systems for reading content from a flexible media.

System Description

FIG. 1 is a schematic side view of a digital printing system 10, in accordance with an embodiment of the present invention. In some embodiments, system 10 comprises a rolling flexible blanket 44 that cycles through an image forming station 60, a drying station 64, an impression station 84 and a blanket treatment station 52. In the context of the present invention and in the claims, the terms "blanket" and "intermediate transfer member (ITM)" are used interchangeably and refer to a flexible member comprising one or more layers used as an intermediate member configured to receive an ink image and to transfer the ink image to a target substrate, as will be described in detail below.

In an operative mode, image forming station 60 is configured to form a mirror ink image, also referred to herein as "an ink image" (not shown) or as an "image" for brevity, of a digital image 42 on an upper run of a surface of blanket 44. Subsequently, when reaching the impression station 84, the ink image is transferred to a target substrate, (e.g., a paper, a folding carton, a multilayered polymer, or any suitable flexible package in a form of sheets or continuous web) located under a lower run of blanket 44.

In the context of the present invention, the term "run" refers to a length or segment of blanket 44 between any two given rollers over which blanket 44 is guided.

In some embodiments, during installation, blanket 44 may be adhered to form a continuous blanket loop (not shown). An example of a method and a system for the installation of the seam is described in detail in U.S. Provisional Application 62/532,400, whose disclosure is incorporated herein by reference.

In some embodiments, image forming station 60 typically comprises multiple print bars 62, each mounted (e.g., using a slider) on a frame (not shown) positioned at a fixed height above the surface of the upper run of blanket 44. In some embodiments, each print bar 62 comprises a strip of print heads substantially as wide as the printing area on blanket 44 and comprises individually controllable print nozzles.

In some embodiments, image forming station 60 may comprise any suitable number of bars 62, each bar 62 may contain a printing fluid, such as an aqueous ink of a different color. The ink typically has visible colors, such as but not limited to cyan, magenta, red, green, blue, yellow, black and white. In the example of FIG. 1, image forming station 60 comprises seven print bars 62, but may comprise, for example, four print bars 62 having any selected colors such as cyan (C), magenta (M), yellow (Y) and black (K).

In some embodiments, the print heads are configured to jet ink droplets of the different colors onto the surface of blanket 44 so as to form the ink image (not shown) on the surface of blanket 44.

In some embodiments, different print bars 62 are spaced from one another along the movement axis, also referred to herein as moving direction of blanket 44, represented by an arrow 94. In this configuration, accurate spacing between bars 62, and synchronization between directing the droplets of the ink of each bar 62 and moving blanket 44 are essential for enabling correct placement of the image pattern.

In the context of the present disclosure and in the claims, the terms "inter-color pattern placement," "pattern placement accuracy," "color-to-color registration," "C2C registration," "color to color position difference," "bar to bar registration," and "color registration" are used interchangeably and refer to any placement accuracy of two or more colors relative to one another.

In some embodiments, system 10 comprises heaters 66, such as hot gas or air blowers and/or infrared-based heaters with gas or air blowers for flowing gas or air at any suitable temperature. Heaters 66 are positioned in between print bars 62, and are configured to partially dry the ink droplets deposited on the surface of blanket 44. This air flow between the print bars may assist, for example, (i) in reducing condensation at the surface of the print heads and/or in handling satellites (e.g., residues or small droplets distributed around the main ink droplet), and/or (ii) in preventing blockage of the inkjet nozzles of the print heads, and/or (iii) in preventing the droplets of different color inks on blanket 44 from undesirably merging into one another. In some embodiments, system 10 comprises drying station 64, configured to direct infrared radiation and/or to blow hot air (or another gas) onto the surface of blanket 44. In some embodiments, drying station 64 may comprise infrared-based illumination assemblies (not shown) and/or air blowers 68 or any other suitable drying apparatus.

In drying station 64, the ink image formed on blanket 44 is exposed to radiation and/or to hot air in order to dry the ink more thoroughly, evaporating most or all of the liquid carrier and leaving behind only a layer of resin and coloring agent which is heated to the point of being rendered tacky ink film.

In some embodiments, system 10 comprises a blanket module 70 comprising a rolling flexible ITM, such as a blanket 44. In some embodiments, blanket module 70 comprises one or more rollers 78, wherein at least one of rollers 78 comprises a motion encoder (not shown), which is configured to record the position of blanket 44, so as to control the position of a section of blanket 44 relative to a respective print bar 62. Note that one or more motion encoders may be integrated with additional rollers and other moving components of system 10 as will be described in detail in FIGS. 2-4 below.

In some embodiments, the aforementioned motion encoders typically comprise at least one rotary encoder configured to produce rotary-based position signals indicative of an angular displacement of the respective roller. Note that in the context of the present invention and in the claims, the terms "indicative of" and "indication" are used interchangeably.

Additionally or alternatively, blanket 44 may comprise an integrated encoder (not shown) for controlling the operation of various modules of system 10. One implementation of the integrated motion encoder is described in detail, for example, in U.S. Provisional Application 62/689,852, whose disclosure is incorporated herein by reference.

In some embodiments, blanket 44 is guided over rollers 76, 78 and other rollers described herein, and over a powered tensioning roller, also referred to herein as a dancer assembly 74. Dancer assembly 74 is configured to control the length of slack in blanket 44 and its movement is schematically represented by a double sided arrow. Furthermore, any stretching of blanket 44 with aging would not affect the ink image placement performance of system 10 and would merely require the taking up of more slack by tensioning dancer assembly 74.

In some embodiments, dancer assembly 74 may be motorized. The configuration and operation of rollers 76 and 78 are described in further detail, for example, in U.S. Patent Application Publication 2017/0008272 and in the above-mentioned PCT International Publication WO 2013/132424, whose disclosures are all incorporated herein by reference.

In some embodiments, system 10 comprises a blanket tension drive roller (BTD) 99 and a blanket control drive roller (BCD) 77, which are powered by respective first and second motors, typically electric motors (not shown) and are configured to rotate about their own first and second axes, respectively.

In some embodiments, BTD 99 is configured to rotate at a first speed, and BCD 77 is configured to rotate at a second speed, which is typically larger than the first speed, so as to maintain the upper run of blanket 44 taut when passing adjacent to image forming station 60. In some embodiments, the first and second speeds are monitored and controlled so as to prevent formation of distortions, e.g., along the movement axis of blanket 44, as will be described in detail in FIGS. 2-4 below.

In some embodiments, system 10 may comprise one or more tension sensors (not shown) disposed at one or more positions along blanket 44. The tension sensors may be integrated in blanket 44 or may comprise sensors external to blanket 44 using any other suitable technique to acquire signals indicative of the mechanical tension applied to blanket 44. In some embodiments, processor 20 and additional controllers of system 10 are configured to receive the signals produced by the tension sensors, so as to monitor the tension applied to blanket 44 and to control the operation of dancer assembly 74.

In impression station 84, blanket 44 passes between an impression cylinder 82 and a pressure cylinder 90, which is configured to carry a compressible blanket. In some embodiments, a motion encoder is integrated with at least one of impression cylinder 82 and pressure cylinder 90.

In some embodiments, system 10 comprises a control console 12, which is configured to control multiple modules of system 10, such as blanket module 70, image forming station 60 located above blanket module 70, and a substrate transport module 80, which is located below blanket module 70 and comprises one or more impression stations as will be described below.

In some embodiments, console 12 comprises a processor 20, typically a general-purpose processor, with suitable front end and interface circuits for interfacing with controllers of dancer assembly 74 and with a controller 54, via a cable 57, and for receiving signals therefrom. Additionally or alternatively, console 12 may comprise any suitable type of an application-specific integrated circuit (ASIC) and/or a digital signal processor (DSP) and/or any other suitable sort of processing unit configured to carry out any sort of processing for data processed in system 10.

In some embodiments, controller 54, which is schematically shown as a single device, may comprise one or more electronic modules mounted on system 10 at predefined locations. At least one of the electronic modules of controller 54 may comprise an electronic device, such as control circuitry or a processor (not shown), which is configured to control various modules and stations of system 10. In some embodiments, processor 20 and the control circuitry may be programmed in software to carry out the functions that are used by the printing system, and store data for the software in a memory 22. The software may be downloaded to processor 20 and to the control circuitry in electronic form, over a network, for example, or it may be provided on non-transitory tangible media, such as optical, magnetic or electronic memory media.

In some embodiments, console 12 comprises a display 34, which is configured to display data and images received from processor 20, or inputs inserted by a user (not shown) using input devices 40. In some embodiments, console 12 may have any other suitable configuration, for example, an alternative configuration of console 12 and display 34 is described in detail in U.S. Pat. No. 9,229,664, whose disclosure is incorporated herein by reference.

In some embodiments, processor 20 is configured to display on display 34, a digital image 42 comprising one or more segments (not shown) of image 42 and/or various types of test patterns that may be stored in memory 22.

In some embodiments, blanket treatment station 52, also referred to herein as a cooling station, is configured to treat the blanket by, for example, cooling it and/or applying a treatment fluid to the outer surface of blanket 44, and/or cleaning the outer surface of blanket 44. At blanket treatment station 52, the temperature of blanket 44 can be reduced to a desired temperature-level before blanket 44 enters into image forming station 60. The treatment may be carried out by passing blanket 44 over one or more rollers or blades configured for applying cooling and/or cleaning and/or treatment fluid on the outer surface of the blanket.

In some embodiments, blanket treatment station 52 may further comprise one or more bars (not shown) positioned adjacent to print bars 62, so that the treatment fluid may additionally or alternatively be applied to blanket 44 by jetting.

In some embodiments, processor 20 is configured to receive, e.g., from temperature sensors (not shown), signals indicative of the surface temperature of blanket 44, so as to monitor the temperature of blanket 44 and to control the operation of blanket treatment station 52. Examples of such treatment stations are described, for example, in PCT International Publications WO 2013/132424 and WO 2017/208152, whose disclosures are all incorporated herein by reference.

In the example of FIG. 1, station 52 is mounted between impression station 84 and image forming station 60, yet, station 52 may be mounted adjacent to blanket 44 at any other or additional one or more suitable locations between impression station 84 and image forming station 60. As described above, station 52 may additionally or alternatively be mounted on a bar adjacent to image forming station 60.

In the example of FIG. 1, impression cylinder 82 impresses the ink image onto the target flexible substrate, such as an individual sheet 50, conveyed by substrate transport module 80 from an input stack 86 to an output stack 88 via impression cylinder 82. In the present example, a rotary encoder (not shown) is integrated with impression cylinder 82, as will be described in detail below.

In some embodiments, the lower run of blanket 44 selectively interacts at impression station 84 with impression cylinder 82 to impress the image pattern onto the target flexible substrate compressed between blanket 44 and impression cylinder 82 by the action of pressure of pressure cylinder 90. In the case of a simplex printer (i.e., printing on one side of sheet 50) shown in FIG. 1, only one impression station 84 is needed.

In other embodiments, module 80 may comprise two or more impression cylinders (not shown) so as to permit one or more duplex printing. The configuration of two impression cylinders also enables conducting single sided prints at twice the speed of printing double sided prints. In addition, mixed lots of single and double sided prints can also be printed. In alternative embodiments, a different configuration of module 80 may be used for printing on a continuous web substrate. Detailed descriptions and various configurations of duplex printing systems and of systems for printing on continuous web substrates are provided, for example, in U.S. Pat. Nos. 9,914,316 and 9,186,884, in PCT International Publication WO 2013/132424, in U.S. Patent Application Publication 2015/0054865, and in U.S. Provisional Application 62/596,926, whose disclosures are all incorporated herein by reference.

As briefly described above, sheets 50 or continuous web substrate (not shown) are carried by module 80 from input stack 86 and pass through the nip (not shown) located between impression cylinder 82 and pressure cylinder 90. Within the nip, the surface of blanket 44 carrying the ink image is pressed firmly, e.g., by compressible blanket (not shown), of pressure cylinder 90 against sheet 50 (or other suitable substrate) so that the ink image is impressed onto the surface of sheet 50 and separated neatly from the surface of blanket 44. Subsequently, sheet 50 is transported to output stack 88.

In the example of FIG. 1, rollers 78 are positioned at the upper run of blanket 44 and are configured to maintain blanket 44 taut when passing adjacent to image forming station 60. Furthermore, it is particularly important to control the speed of blanket 44 below image forming station 60 so as to obtain accurate jetting and deposition of the ink droplets, thereby placement of the ink image, by forming station 60, on the surface of blanket 44.

In some embodiments, impression cylinder 82 is periodically engaged with and disengaged from blanket 44, so as to transfer the ink images from moving blanket 44 to the target substrate passing between blanket 44 and impression cylinder 82. In some embodiments, system 10 is configured to apply torque to blanket 44 using the aforementioned rollers and dancer assemblies, so as to maintain the upper run taut and to substantially isolate the upper run of blanket 44 from being affected by mechanical vibrations occurring in the lower run.

In some embodiments, system 10 comprises an image quality control station 55, also referred to herein as an automatic quality management (AQM) system, which serves as a closed loop inspection system integrated in system 10. In some embodiments, image quality control station 55 may be positioned adjacent to impression cylinder 82, as shown in FIG. 1, or at any other suitable location in system 10.

In some embodiments, image quality control station 55 comprises a camera (not shown), which is configured to acquire one or more digital images of the aforementioned ink image printed on sheet 50. In some embodiments, the camera may comprises any suitable image sensor, such as a Contact Image Sensor (CIS) or a Complementary metal oxide semiconductor (CMOS) image sensor, and a scanner comprising a slit having a width of about one meter or any other suitable width.

In the context of the present disclosure and in the claims, the terms "about" or "approximately" for any numerical values or ranges indicate a suitable dimensional tolerance that allows the part or collection of components to function for its intended purpose as described herein.

In some embodiments, station 55 may comprise a spectrophotometer (not shown) configured to monitor the quality of the ink printed on sheet 50.

In some embodiments, the digital images acquired by station 55 are transmitted to a processor, such as processor 20 or any other processor of station 55, which is configured to assess the quality of the respective printed images. Based on the assessment and signals received from controller 54, processor 20 is configured to control the operation of the modules and stations of system 10. In the context of the present invention and in the claims, the term "processor" refers to any processing unit, such as processor 20 or any other processor or controller connected to or integrated with station 55, which is configured to process signals received from the camera and/or the spectrophotometer of station 55. Note that the signal processing operations, control-related instructions, and other computational operations described herein may be carried out by a single processor, or shared between multiple processors of one or more respective computers.

In some embodiments, station 55 is configured to inspect the quality of the printed images and test pattern so as to monitor various attributes, such as but not limited to full image registration with sheet 50, color-to-color (CTC) registration, printed geometry, image uniformity, profile and linearity of colors, and functionality of the print nozzles. In some embodiments, processor 20 is configured to automatically detect geometrical distortions or other errors in one or more of the aforementioned attributes. For example, processor 20 is configured to compare between a design version (also referred to herein as a "master" or a "source image" of a given digital image and a digital image of the printed version of the given image, which is acquired by the camera.

In other embodiments, processor 20 may apply any suitable type image processing software, e.g., to a test pattern, for detecting distortions indicative of the aforementioned errors. In some embodiments, processor 20 is configured to analyze the detected distortion in order to apply a corrective action to the malfunctioning module, and/or to feed instructions to another module or station of system 10, so as to compensate for the detected distortion.

In some embodiments, system 10 may print testing marks (not shown) or other suitable features, for example at the bevels or margins of sheet 50. By acquiring images of the testing marks, station 55 is configured to measure various types of distortions, such as C2C registration, image-to-substrate registration, different width between colors referred to herein as "bar to bar width delta" or as "color to color width difference", various types of local distortions, and front-to-back registration errors (in duplex printing). In some embodiments, processor 20 is configured to: (i) sort out, e.g., to a rejection tray (not shown), sheets 50 having a distortion above a first predefined set of thresholds, (ii) initiate corrective actions for sheets 50 having a distortion above a second, lower, predefined set of threshold, and (iii) output sheets 50 having minor distortions, e.g., below the second set of thresholds, to output stack 88.

In some embodiments, processor 20 is further configured to detect, e.g., by analyzing a pattern of suitable printed features, additional geometric distortion such as scaling up or down, skew, or a wave distortion occurred in at least one of: (i) an axis parallel to the movement axis of blanket 44, and (ii) an axis orthogonal to the movement axis of blanket 44.

In some embodiments, processor 20 is configured to detect, based on signals received from the spectrophotometer of station 55, deviations in the profile and linearity of the printed colors.

In some embodiments, the processor of station 55 is configured to decide whether to stop the operation of system 10, for example, in case the density of distortions is above a specified threshold. The processor of station 55 is further configured to initiate a corrective action in one or more of the modules and stations of system 10, as described above. As will be described below, the corrective action may be carried out on-the-fly (while system 10 continue the printing process), or offline, by stopping the printing operation and fixing the problem in a respective modules and/or station of system 10. In other embodiments, any other processor or controller of system 10 (e.g., processor 20 or controller 54) is configured to start a corrective action or to stop the operation of system 10 in case the density of distortions is above a specified threshold.

Additionally or alternatively, processor 20 is configured to receive, e.g., from station 55, signals indicative of additional types of distortions and problems in the printing process of system 10. Based on these signals processor 20 is configured to automatically estimate the level of pattern placement accuracy and additional types of distortions and/or defects not mentioned above. In other embodiments, any other suitable method for examining the pattern printed on sheets 50 (or on any other substrate described above), can also be used, for example, using an external (e.g., offline) inspection system, or any type of measurements jig and/or scanner. In these embodiments, based on information received from the external inspection system, processor 20 is configured to initiate any suitable corrective action and/or to stop the operation of system 10.

The configuration of system 10 is simplified and provided purely by way of example for the sake of clarifying the present invention. The components, modules and stations described in printing system 10 hereinabove and additional components and configurations are described in detail, for example, in U.S. Pat. Nos. 9,327,496 and 9,186,884, in PCT International Publications WO 2013/132438, WO 2013/132424 and WO 2017/208152, in U.S. Patent Application Publications 2015/0118503 and 2017/0008272, whose disclosures are all incorporated herein by reference.

The particular configurations of system 10 is shown by way of example, in order to illustrate certain problems that are addressed by embodiments of the present invention and to demonstrate the application of these embodiments in enhancing the performance of such systems. Embodiments of the present invention, however, are by no means limited to this specific sort of example systems, and the principles described herein may similarly be applied to any other sorts of printing systems.

Figure 2:
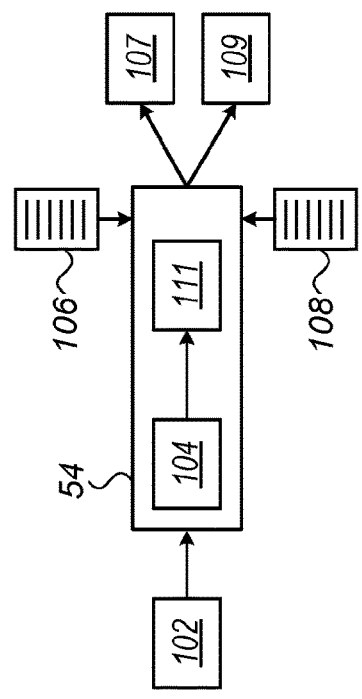
FIG. 2 is a block diagram that schematically illustrates a workflow for synchronizing gear ratio of motion assemblies in a digital printing system, in accordance with an embodiment of the present invention.

Using a Virtual Axis for Synchronizing Gear Ratio of BCD and BTD Rollers with Impression Cylinder Speed FIG. 2 is a block diagram that schematically illustrates a workflow for synchronizing the gear ratio of BCD 77 and BTD 99 with the speed of impression cylinder 82 using a virtual axis 111, in accordance with an embodiment of the present invention. In some embodiments, the workflow may be implemented so as to maintain blanket 44 taut while moving at a predefined speed (or within a range of speeds) at least between BTD 99 and impression station 84.

In some embodiments, system 10 comprises a rotary encoder 102, which is integrated with impression cylinder 82 (FIG. 1). Encoder 102 is configured to produce rotary-based position signals indicative of an angular displacement of impression cylinder 82. In some embodiments, encoder 102 is configured to produce the position signals at a predefined frequency, in the present example a frequency of about 1 KHz.

In some embodiments, system 10 comprises a smoothing filter 104, in the present example a low-pass filter, which is applied to the position signals received from encoder 102 for filtering-out frequencies larger than a predefined cutoff threshold, e.g., about 50 Hz. Smoothing filter 104 may be implemented in any suitable device of system 10, such as in processor 20 and/or controller 54, and may apply moving average or any other suitable technique for smoothing the position signals received from encoder 102.

In some embodiments, system 10 comprises a virtual axis 111, which may be implemented as a software module in controller 54 or in any other suitable device. Virtual axis 111 is configured to receive the position signals from smoothing filter 104, and to produce signals indicative of the angular position and the speed of impression cylinder 82.

In some embodiments, controller 54 is configured to receive an input 106 comprising parameters associated with BCD 77, and an input 108 comprising parameters associated with BTD 99. Input 106 may comprise any suitable parameters, such as but not limited to: (i) nominal diameter of BCD 77, (ii) compensation for changes in the diameter of BCD 77, e.g., based on estimated or measured temperature of BCD 77, and (iii) target speed of BCD 77 (typically rotational speed, but can also be an estimation of a linear speed). Similarly, input 108 may comprise the nominal diameter of BTD 99 and other parameters, such as the estimated or measured temperature on BTD 99, and the target speed of BTD 99 (typically rotational speed, but can also be an estimation of a linear speed).

In some embodiments, in addition to compensation for changes in the diameter of BCD 77, controller 54 is configured to compensate for additional variations, such as but not limited to variations in the effective thickness of blanket 44, the effective spring constant of blanket 44 that resist the tension applied to blanket 44.

In some embodiments, based on: (i) the position and rotational speed of impression cylinder 82, and (ii) inputs 106 and 108, controller 54 is configured to determine a BCD gear ratio (BCDGR) 107, and a BTD gear ratio (BTDGR) 109, which are physical axes of BCG 77 and BTG 99, respectively. For example, in order to maintain blanket 44 taut between BTD 99 and impression station 84, controller 54 may determine a ratio of 1.1, or 1.01, or 1.001 or any other suitable ratio, between BCDGR 107 and BTDGR 109.

In such embodiments, BCD 77 rotates about its fixed axis with a first angular speed (e.g., the nominal rotational speed of BCD 77 is between about 5 rounds per second and 6 rounds per second) and in the present example, about 5.42 rounds per second. Note that based on the gear ratios described above, BTD 99 rotates about its fixed axis with a second angular speed at the same time interval that BCD 77 rotates, but at a different rotational speed. For example, when BCD 77 rotates at a nominal rotation speed of about 5.42 rounds per second, BTD 99 rotates at a nominal rotational speed of about 5.414 rounds per second, which is calculated by dividing the aforementioned nominal rotational speed (5.42 rounds per second) of BCD 77, by the gear ratio of 1.001 (5.42/1.001).

In the context of the present disclosure and in the claims, the signal receiving, signal processing and process control operations may be carried out by controller 54 and/or processor 20, or may be partitioned therebetween. For example, when describing embodiments carried out by controller 54, the same embodiments may be carried out by processor 20.

In some embodiments, by applying the workflow of FIG. 2, controller 54 is configured to synchronize the linear speed of blanket 44 passing through BTD 99, BCD 77 and impression cylinder 82, so as to maintain blanket 44 taut: (i) when passing along the upper run of blanket 44 in the moving direction of blanket 44, between BTD 99 and BCD 77, for forming the image on blanket 44, and (ii) when passing though impression station 84, for transferring the image from blanket 44 to sheet 50. In such embodiments, controller 54 is configured to carry out the aforementioned synchronization, by defining the speed of blanket 44 so that at each revolution of blanket 44, the image formed on blanket 44 falls on the same section of impression cylinder 82 for being transferred to sheet 50. Note that this synchronization improves the matching between images printed by system 10.

In some embodiments, controller 54 is further configured to apply the operation of dancer assembly 74 to the calculation of the rotational speeds of BTD 99, BCD 77 and impression cylinder 82.

In some embodiments, dancer assembly 74 comprises one or more load cells (not shown), each load call typically comprising a piezoelectric element, which is configured for measuring the pressure applied to blanket 44 by dancer assembly 74. The load cell may function similarly to a weight measurement device, which is configured, in response to a given pressure applied to the load cell, to output a signal indicative of the given pressure. The given pressure is also indicative of the tension applied to blanket 44.

In the present example, dancer assembly comprises two load cells mounted at the two respective ends of dancer assembly 74. Note that, because blanket 44 is flexible, the pressure and tension applied by dancer assembly 74 may alter the length of blanket 44 (e.g., due to an elastic deformation).

In some embodiments, controller 54 controls dancer assembly 74 to maintain a preassigned (e.g., constant) tension to blanket 44. Moreover, based on the signals received from the two load cells mounted on dancer assembly 74, controller 54 is configured to estimate the length of blanket 44 and to adjust the rotational speed of BCD 77 and BTD 99 based on the estimated length. Moreover, controller 54 is configured to control the position of one or more elements of dancer assembly 74, so as to obtain the preassigned tension to blanket 44 and to synchronize the motion of blanket 44 so that the image printed on blanket 44 will be transferred to sheet 50 at the intended section of impression cylinder 82.

In some embodiments, when system 10 moves blanket 44, controller 54 is configured to receive a first signal indicative of a first electrical current measured on the motor of BTD 99. Controller 54 is further configured to receive a second signal indicative of a second electrical current, measured on the motor of BCD 77 The second electrical current may be different, e.g., larger, compared to the first electrical current. In some embodiments, the first and second electrical currents are typically indicative of first and second respective torque forces applied to blanket 44 via BTD 99 and BCD 77, respectively.

In other embodiments, at least one of the first and second signals may be received from one or more other devices, which are configured to measure tension applied to blanket 44. For example, the flexibility of blanket 44 may be translated to a constant of a spring, which may be calculated based on the distance measured between two predefined features of blanket 44. For example, blanket 44 may comprise a fabric having fibers arranged along the movement direction of blanket 44. In such embodiments, system 10 may comprise one or more sensors, which are configured to output signals indicative of the position of given fibers of blanket 44. Based on the signals, controller 54 and/or processor 20 are configured to estimate the length of blanket 44, and to adjust the tension applied to blanket 44 (e.g., tension applied to the upper run, between BTD 99 and BCD 77) and/or the speed of blanket 44 in the movement direction, as described above.

In some embodiments, controller 54 is configured to calculate, based on the first and second signals, a parameter, which is indicative of a distortion, such as but not limited to: (i) a wave X(Y) distortion, (ii) a wave Y(X) distortion, (iii) C2C registration error between two or more colors of the image formed on blanket 44, (iv) a deviation in the pattern placement accuracy (PPA) of at least a section of the image formed on blanket 44 and transferred to sheet 50, referred to herein as image to substrate registration error, or (v) any combination of the above.

In some embodiments, the parameter may comprise the difference between the aforementioned first and second electrical currents, which is indicative of torque, and therefore of the tension, applied to blanket 44 when the blanket is moved in the moving direction, between BTD 99 and BCD 77. Note that in the present example, the current is determined based on the printing application, and therefore, the maximal current is normalized to 100%, and the difference between the first and second electrical currents is measured by percentage normalized to the maximal current. For example, the second electrical current measured on the motor of BCD 77 may be normalizing to about 75% of the maximal current, and the first electrical current measured on the motor of BTD 99 may be normalizing to about 42% of the maximal current. In this example, the difference between the first and second electrical currents is about 33%.

In some embodiments, controller 54 is configured to hold control thresholds for the difference between the first and second electrical currents. For example, controller 54 may detect a degradation in the X(Y) wave distortion, because blanket 44 is not sufficiently taut when the difference between the first and second electrical currents is smaller than a certain threshold (e.g. about 29%) or larger than a certain threshold (e.g. about 33%). In such embodiments, processor 20 may apply a corrective action, such as adjusting the speed of at least one of the motors of BCD 77 and BTD 99, so as to have the required difference between the first and second electrical currents (e.g. between about 29% and 33%). Note that the monitoring and corrective action described above may be carried out at any predefined timing during the printing cycle, preferably before applying the image to blanket 44 by image forming station. Thus, processor 20 is configured to control image forming station 60 to apply the image to blanket 44 only after obtaining, between the first and second electrical currents, a stable predefined difference (e.g. between about 29% and 33%).

Figure 3:
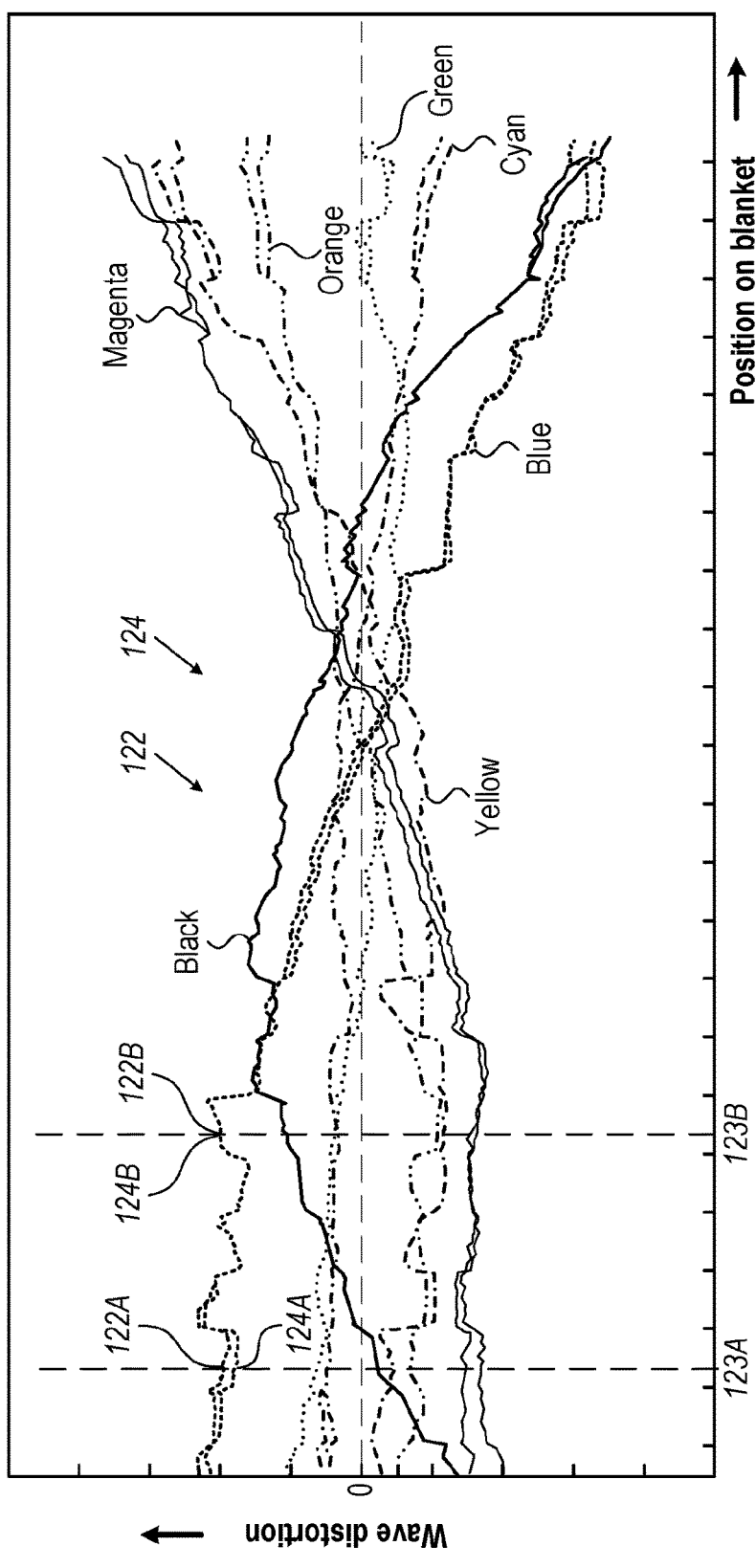
FIG. 3 is a graph that schematically illustrates a distortion measured on two similar images formed on a flexible substrate in different times, in accordance with an embodiment of the present invention.

Mitigating Wave Distortion by Measuring Electrical Currents in BCD And BTD Motors FIG. 3 is a graph 120 that schematically illustrates a wave distortion of multiple color measured on two similar images formed on blanket 44 at a time difference of about four days, in accordance with an embodiment of the present invention.

In some embodiments, the wave distortion was measured and calculated using any suitable inspection technique, such as using image quality control station 55 described in FIG. 1 above. The vertical axis of graph 120 represents a distortion error, in the present example the wave distortion error.

The wave distortion error may occur along the movement direction of blanket 44, referred to herein as an X axis, that change with the position on a Y axis (orthogonal to the X axis), referred to herein as wave X(Y) and shown in graph 120. Note that the wave distortion is calculated based on the distance measured between the intended position and the measured position of a given pattern of each color of the printed image. In the context of the present disclosure, the term "intended position" refers to the position of the given pattern of each color in the design of the image intended to be printed by system 10.

In the example of graph 120, the distance is measured relative to the horizontal dashed line, which is extended from the number "0" of the wave distortion axis, and represents zero distortion. The curves above and below the dashed line are indicative of the direction of the deviation of the measured positions of the pattern relative to the intended position.

In other embodiments, a different graph (not shown in FIG. 3) may show a distortion along Y axis that changes with the position on X axis, referred to herein as wave Y(X).

The wave distortion may be caused by various errors, such as but not limited to: (i) a deviation from the specified motion profile of blanket 44, (ii) a deviation from the specified relative speed between blanket 44 and sheet 50 at impression station 84, (iii) a deviation of the profile (e.g., position, shape and orientation) of print bar 62 relative to blanket 44, and (iv) other deviations caused by altering temperature of one or more components and/or modules and/or stations of system 10.

In the example of FIG. 3, graph 120 comprises graphs 122 and 124 of the two respective similar images having seven different colors of ink (in the present example, black, blue, cyan, green, magenta, orange and yellow).

In some embodiments, the two similar images have been formed at a time difference of about four days, e.g., during a continuous operation of system 10. Respective graphs 122 and 124 are shown overlaid on graph 120 and are indicative of the measured wave X(Y) distortion of each color in each of the two images.

The errors described above, and additional errors, may result in a wavy pattern of the printed features as shown in graph 120. Note that typically the wavy pattern has two components: (i) a common wave of all colors, e.g., due to the aforementioned deviation at impression station 84, and (ii) different waves formed in each color image are caused, for example, due to temporary variation in the velocity of and tension applied to blanket 44, for example, when the upper run passes between print bars of different colors.

In some embodiments, controller 54 is configured to control the motors of BCD 77 and BTD 99 to retain a difference (e.g. of about 32%) between the measured first and second electrical currents, as described in FIG. 2 above. In the present example, the aforementioned difference is maintained for at least four days, so as to maintain blanket 44 taut when system 10 is printing images during this period of time.

As shown in graph 120, the profile of wave distortion is maintained for each color in both images. For example, at a position 123A on blanket 44, the measured wave distortion of the blue color of ink, shown in points 122A and 124A of respective graphs 122 and 124, has a minor difference (e.g., between a few microns and about 10 μm). Similarly, at a different position 123B on blanket 44, the wave distortion of the blue color is identical in both images, as shown by points 122B and 124B of graphs 122 and 124, respectively.

In some embodiments, controller 54 is configured to maintain the profile of the wave distortion of each color of ink stable over time. In the present example, the wave profile is maintained by controlling the difference between the measured electrical currents of the motors of BCD 77 and BTD 99, within a suitable specified range, such as the range described in FIG. 2 above.

In some embodiments, processor 20 may apply various techniques for correcting a wave distortion in a printed image. Some implementations of wave distortion correction are described in detail, for example, in U.S. Patent Application Publication 2019/0152218, and in U.S. Provisional Application 62/717,957, whose disclosures are incorporated herein by reference. In some embodiments, after correcting the wave distortion, the disclosed techniques may be applied to maintain the correction stable over the operational time of system 10. Moreover, the disclosed techniques may retain the stability of correction for both wave X(Y) and wave Y(X) described above.

Figure 4:
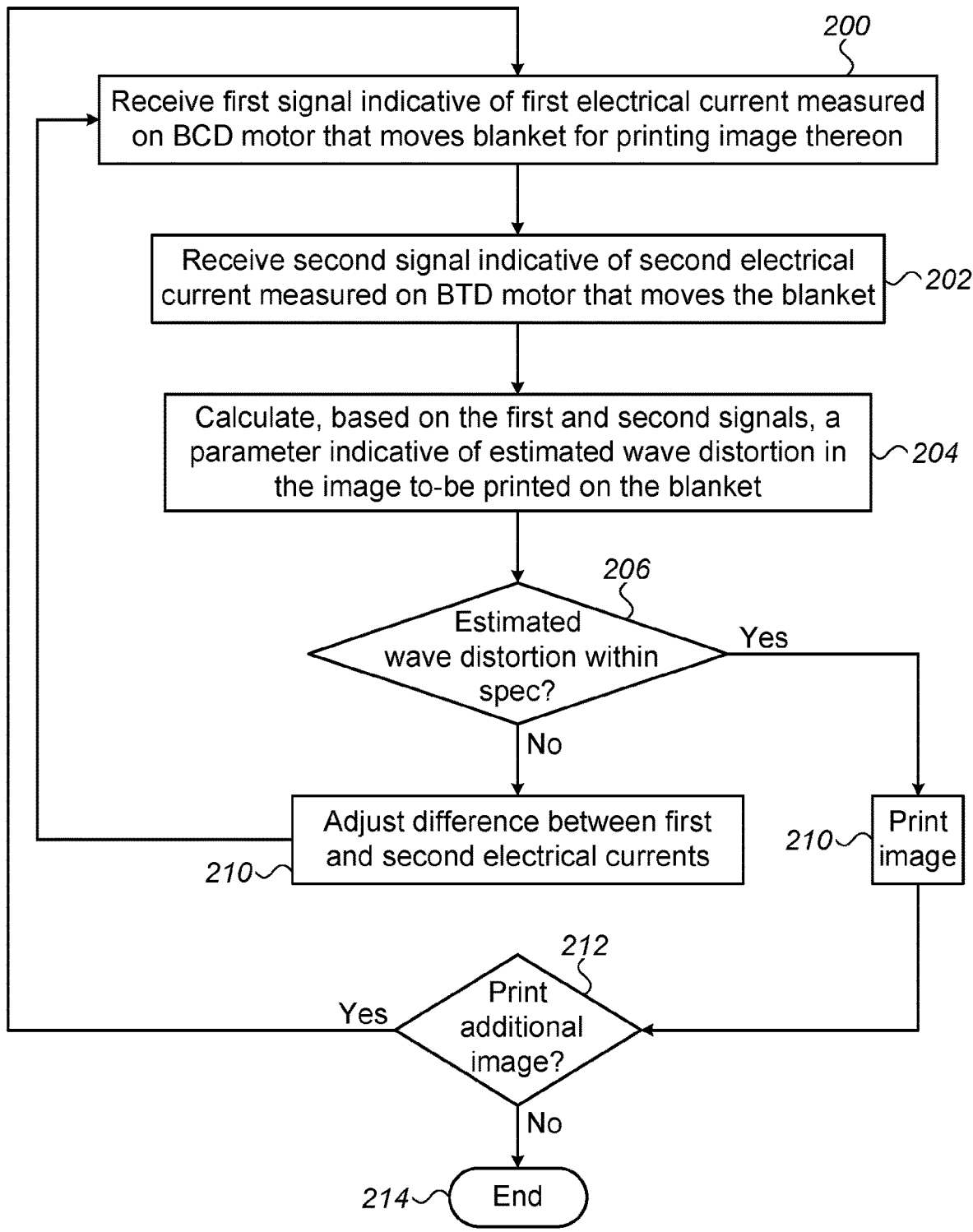
FIG. 4 is a flow chart that schematically illustrates a method for mitigating a distortion occurred in digitally printed images, in accordance with an embodiment of the present invention.

FIG. 4 is a flow chart that schematically illustrates a method for improving stability of wave distortion over time, in accordance with an embodiment of the present invention. The method begins at a first signal receiving step 200 with receiving (e.g., by controller 54) a first signal indicative of a first electrical current measured on the motor of BCD 77 that moves blanket 44 for printing an image thereon. At a second signal receiving step 202, controller 54 receives a second signal indicative of a second electrical current measured on the motor of BTD 99 that moves blanket 44 together with BCD 77. In some embodiments, controller 54 and/or processor 20 may hold a predefined process window having, inter alia, a threshold of the difference between the first and second measured currents. In such embodiments, controller 54 and/or processor 20 are configured to hold the operation of system 10 when the difference between the first and second measured currents is larger than the threshold.

At a parameter calculation step 204, controller 54 calculates, based on the first and second signals, a parameter indicative of the estimated wave distortion in the image intended to be printed on blanket 44. In some embodiments, controller 54 is configured to calculate, based on the difference between the first and second electrical currents, one or more indications of the estimated wave distortion. Such wave distortions may be related to errors of pattern placement accuracy (PPA) during the printing process of the image in system 10.

In some embodiments, when monitoring the difference between the first and second electrical currents, controller 54 is configured to hold thresholds (e.g., about 29% and 33% of the maximal electrical current as described in FIG. 2 above), which are indicative of whether the estimated wave distortion is within the specification of the image forming process, or whether the estimated wave distortion exceeds the specification. At a first decision step 206, controller 54 compares between: (i) the calculated difference between the first and second electrical currents, and (ii) the threshold described above, so as to check whether or not the estimated wave distortion is within the specification of the image forming process.

In some embodiments, in case the estimated wave distortion exceeds the specification of the image forming process, the method proceeds to an electrical current adjustment step 208. In some embodiments, at step 208, controller 54 adjusts the speed of at least one of BCD 77 and BTD 99, so as to obtain the difference between the first and second electrical currents within the specified range, e.g., between about 29% and 33%, as described in FIG. 2 above.

In some embodiments, after step 208, the method loops back to step 200 for receiving the first and second signals, and checking (e.g., at step 206) whether the estimated distortion is within the specification of the printing process.

In other embodiments, in case the estimated wave distortion is within the specification of the image forming process, the method proceeds to an image printing step 210, with controlling the stations of system 10 to apply ink droplets to blanket 44, so as to form the image thereon.

At a second decision step 212, processor 20 checks, based on the printing plan of system 10, whether or not to print an additional image on blanket 44. In case the printing plan requires printing an additional image on blanket 44, the method loops back to step 200 for receiving the signals, estimating whether the estimated wave distortion is within the specification of the printing process, and if needed, adjusting the speed of at least one of BCD 77 and BTD 99.

In other embodiments, in case the printing plan does not require printing an additional image in step 212, the method proceeds to a termination step 214 that concludes the method.

Although the embodiments described herein mainly address distortions related to digital printing of image on a flexible substrate, the methods and systems described herein can also be used in other applications, such as in systems comprising moving flexible substrate/blanket/belt and control means thereof.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
receiving a first signal indicative of a first electrical current measured on a first motion assembly for moving a flexible substrate that receives droplets of a printing fluid from an image forming station to form an image thereon;
receiving a second signal indicative of a second electrical current measured on a second motion assembly for moving the flexible substrate, wherein a section of the flexible substrate is moving between the first and second motion assemblies;
calculating, based on the first and second signals, a parameter, which is indicative of a distortion in the image; and
in response to detecting, based on the parameter, an increase in the distortion, applying a corrective action to reduce the distortion, wherein the first motion assembly comprises a first roller, and a first motor and a first gear for rotating the first roller, wherein the second motion assembly comprises a second roller, and a second motor and a second gear for rotating the second roller, and wherein applying the corrective action comprises adjusting at least one of the first and second gears in response to detecting that at least one of first and second variables exceeds a predefined threshold.

2. The method according to claim 1, wherein the image has first and second axes, wherein the distortion comprises a displacement of a pattern, in at least a section of the image, along the first axis that changes with a position along the second axis, and wherein applying the corrective action comprises reducing an increase in the displacement along the first axis.

3. The method according to claim 2, wherein the first axis is orthogonal to the second axis, and wherein the first axis is parallel to a movement axis of the flexible substrate.

4. The method according to claim 2, wherein the first axis is orthogonal to the second axis, and wherein the first axis is orthogonal to a movement axis of the flexible substrate.

5. The method according to claim 2, wherein the image comprises a first color having a first pattern and a second color having a second pattern, wherein the distortion comprises a variation in the displacement between the first pattern and the second pattern, and wherein applying the corrective action comprises reducing an increase in the variation of the displacement.

6. The method according to claim 1, wherein the distortion comprises a variation in a color-to-color position difference between first and second colors of the image, and wherein applying the corrective action comprises reducing an increase in the variation of the color-to-color position difference in the image.

7. The method according to claim 1, wherein the flexible substrate comprises an intermediate transfer member (ITM) for transferring the image to a target substrate in an impression station, and comprising receiving a third signal indicative of a velocity of the ITM at the impression station, and wherein applying the corrective action comprises, in response to detecting, based on the third signal, that the velocity has changed beyond a predefined velocity range, adjusting a speed in at least one of the first and second motion assemblies.

8. The method according to claim 7, and comprising:
receiving: (i) a first input signal indicative of one or more of the first variables of the first motion assembly, and (ii) a second input signal indicative of one or more of the second variables of the second motion assembly, and
defining a virtual axis for determining, based on: (i) the third signal, and (ii) the first and second input signals, a first speed of the ITM in the first motion assembly, and a second speed of the ITM in the second motion assembly.

9. The method according to claim 8, wherein at least one of the first and second variables is selected from a list consisting of: (i) a diameter of the roller, (ii) a temperature of the roller, and (iii) a nominal speed of the roller.

10. A system, comprising:
an interface, which is configured to: (i) receive a first signal indicative of a first electrical current measured on a first motion assembly for moving a flexible substrate that receives droplets of a printing fluid from an image forming station to form an image thereon, and (ii) receive a second signal indicative of a second electrical current measured on a second motion assembly for moving the flexible substrate, wherein a section of the flexible substrate is moving between the first and second motion assemblies; and
a processor, which is configured to: (i) calculate, based on the first and second signals, a parameter, which is indicative of a distortion in the image, and (ii) in response to detecting, based on the parameter, an increase in the distortion, the processor is configured to apply a corrective action to reduce the distortion, wherein the first motion assembly comprises a first roller, and a first motor and a first gear for rotating the first roller, wherein the second motion assembly comprises a second roller, and a second motor and a second gear for rotating the second roller, and wherein the processor is configured to apply the corrective action by adjusting at least one of the first and second gears in response to detecting that at least one of first and second variables exceeds a predefined threshold.

11. The system according to claim 10, wherein the image has first and second axes, wherein the distortion comprises a displacement of a pattern, in at least a section of the image, along the first axis that changes with a position along the second axis, and wherein the processor is configured to apply the corrective action by reducing an increase in the displacement along the first axis.

12. The system according to claim 11, wherein the first axis is orthogonal to the second axis, and wherein the first axis is parallel to a movement axis of the flexible substrate.

13. The system according to claim 11, wherein the first axis is orthogonal to the second axis, and wherein the first axis is orthogonal to a movement axis of the flexible substrate.

14. The system according to claim 11, wherein the image comprises a first color having a first pattern and a second color having a second pattern, wherein the distortion comprises a variation in the displacement between the first pattern and the second pattern, and wherein the processor is configured to apply the corrective action by reducing an increase in the variation of the displacement.

15. The system according to claim 10, wherein the distortion comprises a variation in a color-to-color position difference between first and second colors of the image, and wherein the processor is configured to apply the corrective action by reducing an increase in the variation of the color-to-color position difference in the image.

16. The system according to claim 10, wherein the flexible substrate comprises an intermediate transfer member (ITM) for transferring the image to a target substrate in an impression station, wherein the interface is configured to receive a third signal indicative of a velocity of the ITM at the impression station, and wherein, in response to detecting, based on the third signal, that the velocity has changed beyond a predefined velocity range, the processor is configured to adjust a speed in at least one of the first and second motion assemblies.

17. The system according to claim 16, wherein the interface is configured to receive: (i) a first input signal indicative of one or more of the first variables of the first motion assembly, and (ii) a second input signal indicative of one or more of the second variables of the second motion assembly, and wherein the processor is configured to define a virtual axis for determining, based on: (i) the third signal, and (ii) the first and second input signals, a first speed of the ITM in the first motion assembly, and a second speed of the ITM in the second motion assembly.

18. The system according to claim 17, wherein at least one of the first and second variables is selected from a list consisting of: (i) a diameter of the roller, (ii) a temperature of the roller, and (iii) a nominal speed of the roller.

* * * * *